(12) United States Patent
Moss et al.

(10) Patent No.: US 11,348,252 B1
(45) Date of Patent: May 31, 2022

(54) METHOD AND APPARATUS FOR SUPPORTING AUGMENTED AND/OR VIRTUAL REALITY PLAYBACK USING TRACKED OBJECTS

(71) Applicant: Nevermind Capital LLC, Wilmington, DE (US)

(72) Inventors: Alan Moss, Laguna Beach, CA (US); Krishnaprasad Jagadash, Irvine, CA (US); Hector Medina, Laguna Beach, CA (US); Fabricio Tofoli, Rancho Santa Margarita, CA (US); Joel Phillips, Whittier, CA (US); Jun Liu, Irvine, CA (US); Ramesh Panchagnula, Irvine, CA (US); Vassilios Mavros, Lake Forest, CA (US)

(73) Assignee: Nevermind Capital LLC, Wilmington, DE (US)

( * ) Notice: Subject to any disclaimer, the term of this patent is extended or adjusted under 35 U.S.C. 154(b) by 0 days.

(21) Appl. No.: 16/512,241

(22) Filed: Jul. 15, 2019

Related U.S. Application Data

(63) Continuation-in-part of application No. 16/510,869, filed on Jul. 12, 2019.

(60) Provisional application No. 62/697,408, filed on Jul. 13, 2018, provisional application No. 62/697,404, filed on Jul. 13, 2018, provisional application No. 62/697,290, filed on Jul. 12, 2018.

(51) Int. Cl.
*G06T 7/194* (2017.01)
*G06T 19/00* (2011.01)
*G06T 7/73* (2017.01)
*G06T 15/04* (2011.01)

(52) U.S. Cl.
CPC ............... *G06T 7/194* (2017.01); *G06T 7/73* (2017.01); *G06T 15/04* (2013.01); *G06T 19/006* (2013.01)

(58) Field of Classification Search
CPC G06T 7/194; G06T 7/73; G06T 15/04; G06T 19/006
See application file for complete search history.

(56) References Cited

U.S. PATENT DOCUMENTS

| 9,536,344 | B1 * | 1/2017 | Baszucki | A63F 13/655 |
| 10,497,180 | B1 * | 12/2019 | Perfilev | G06T 7/74 |
| 10,593,066 | B1 * | 3/2020 | Dhua | H04N 19/597 |

(Continued)

*Primary Examiner* — Siamak Harandi
(74) *Attorney, Agent, or Firm* — Blank Rome LLP

(57) ABSTRACT

Methods for capturing and generating information about objects in a 3D environment that can be used to support augmented reality or virtual reality playback operations in a data efficient manner are described. In various embodiments one or more frames including foreground objects are generated and transmitted with corresponding information that can be used to determine the location where the foreground objects are to be positioned relative to a background for one or more frame times are described. Data efficiency is achieved by specifying different locations for a foreground object for different frame times avoiding in some embodiments the need to transmit an image and depth information defining the same of the foreground for each frame time. The frames can be encoded using a video encoder even though some of the information communicated are not pixel values but alpha blending values, object position information, mesh distortion information, etc.

10 Claims, 12 Drawing Sheets

(56) References Cited

U.S. PATENT DOCUMENTS

| | | | |
|---|---|---|---|
| 2016/0253795 A1* | 9/2016 | Cole | H04N 13/232 |
| | | | 345/426 |
| 2016/0344995 A1* | 11/2016 | Bruls | H04N 13/128 |
| 2017/0278304 A1* | 9/2017 | Hildreth | G06F 3/011 |
| 2017/0302918 A1* | 10/2017 | Mammou | H04N 19/162 |
| 2017/0310945 A1* | 10/2017 | Juang | H04N 13/189 |
| 2018/0255308 A1* | 9/2018 | Yi | H04N 21/854 |
| 2019/0096438 A1* | 3/2019 | Shafir Nir | H04N 21/85 |
| 2019/0179405 A1* | 6/2019 | Sun | G06Q 30/0643 |
| 2020/0228836 A1* | 7/2020 | Schwarz | H04N 13/117 |

* cited by examiner

ASSEMBLED MESH

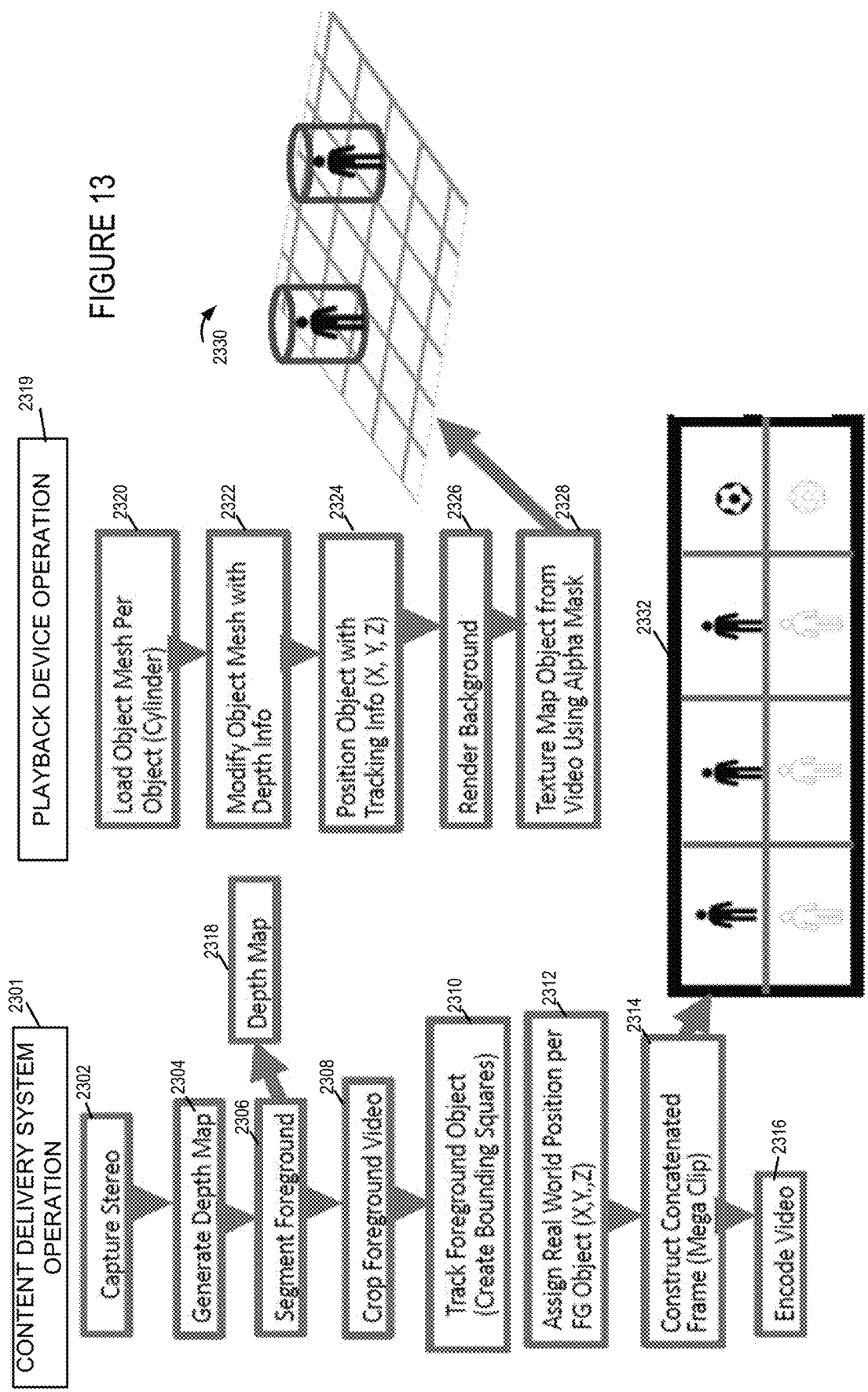

METHOD AND APPARATUS FOR SUPPORTING AUGMENTED AND/OR VIRTUAL REALITY PLAYBACK USING TRACKED OBJECTS

RELATED APPLICATIONS

The present application claims the benefit of U.S. Provisional Application Ser. No. 62/697,404 which was filed on Jul. 13, 2018 and the benefit of U.S. Provisional Application Ser. No. 62/697,408 which was filed on Jul. 13, 2018 and is a continuation-in-part of U.S. patent application Ser. No. 16/510,869 which was filed on Jul. 12, 2019 and which claims benefit of U.S. Provisional Application Ser. No. 62/697,290 which was filed on Jul. 12, 2018 with each of the preceding patent applications hereby being expressly incorporated by reference in their entirety.

FIELD

The present invention relates to methods and apparatus for capturing, streaming and/or playback of content, e.g., content which can be used to simulate an environment and/or ongoing action in an environment.

BACKGROUND

In order to simulate an environment images are sometimes captured in the environment and transmitted to a playback device. The images may then be applied to a model of the environment as a texture, e.g., using information sometimes called a texture map or UV map which indicates how to apply the captured image as a texture to the model of the environment.

The capture and stream of images of an environment can be very data intensive particularly if the images are high resolution images of the type now expected by many viewers. The transmission of a large amount of data associated with such an approach can be problematic given data transmission constraints.

In view of the above it should be appreciated that there is a need for improved methods and/or apparatus for communicating information about an environment, e.g., captured image content, to a playback device.

SUMMARY

In various embodiments a content transmission system captures images of an environment. The images are analyzed to identify objects which move. Such objects are considered foreground objects since they pass in front of other objects which they may obscure. The foreground objects are extracted from a captured image and the areas of the captured image where the foreground object was extracted are patched with content from another image captured when the foreground object was not blocking the view of the area from which the image of the foreground object was extracted. In this way a background image without occlusions can be constructed from multiple sequential images which are captured.

In other embodiments, e.g., some augmented reality embodiments, the background is captured separately, e.g., using a camera on the playback device, and foreground objects captured from images captured at another location are inserted as part of a virtual reality or immersive experience into the environment which supplied the background objects. In such a case the foreground objects may be extracted from images captured at one site, e.g.—at a basketball game, and presented in images to a user of a playback device as if they were in an environment where background images were captured, e.g., the location where the playback device is located.

For example in one augmented reality embodiment basketball players and a ball which are treated as foreground objects are captured and extracted from images taken at a basketball game and then combined with images of an different environment such as images captured in a room to give the impression that the basketball players are playing in the living room, e.g., on a coffee table.

While the foreground objects may move and change their location relatively frequently, the background in many situations tends to be relatively stable. Accordingly, it should be appreciated that if efficient methods for communicating and updating information about foreground objects could be achieved considerable efficiencies could be achieved in terms of data transmission and rendering of background images portions since the background often makes up a large portion of an environment.

In some embodiments foreground objects are identified in captured images and cut out to be used as textures. The images of multiple foreground objects are packed into a frame along with information about the location of the object in the original environment so that the relative locations of the objects can be maintained with respect to one another when inserted into another environment for display.

In some embodiments depth information is used to determine the shape of individual foreground objects. A default mesh shape, e.g., a mesh in the shape of a small cylinder, is used in the playback device to represent the shape of an individual object. Based on the determined shape of the object the content delivery system determines how the default shape of the object mesh used for foreground objects should be distorted by the playback device to more accurately represent the foreground object. In addition to mesh distortion information, the distribution system includes with the cropped image of the foreground object information about how portions of the image of the foreground object should be combined with the background over which it is layered. Such information is provided in the form of alpha blending values in some embodiments. The alpha blending values can be used as a mask by controlling which portions of the transmitted foreground image will block out the background portion over which the foreground object is layered. Thus while a rectangular image may be communicated as a foreground texture corner, other portions which do not include image content showing the foreground image will not contribute to the final output since an alpha blending coefficient of 0 may be associated with such portions so they do not contribute to the output.

Images of multiple foreground objects to be used as textures are packed into a single frame. Foreground objects corresponding to multiple different playback frames may be, and sometimes are, included in a single transmitted encoded frame with the communicated information indicating which time period or frames a particular foreground object texture relates to.

By communicating textures in the form of cropped images an entire captured image frame need not be communicated to the playback device each time there is a change, e.g., movement, in the captured environment. Furthermore the rate at which foreground object information is updated and communicated to the playback device can different, e.g., faster, than the rate at which background image content is updated.

Numerous variations on the above described methods and apparatus are possible.

BRIEF DESCRIPTION OF THE FIGURES

FIG. 13 shows both a method performed by a content delivery system in accordance with some embodiments and a method performed by a playback device which receives the encoded frames and corresponding information generated and provided by the content delivery method shown on the left side of FIG. 13.

DETAILED DESCRIPTION

Figure 1:
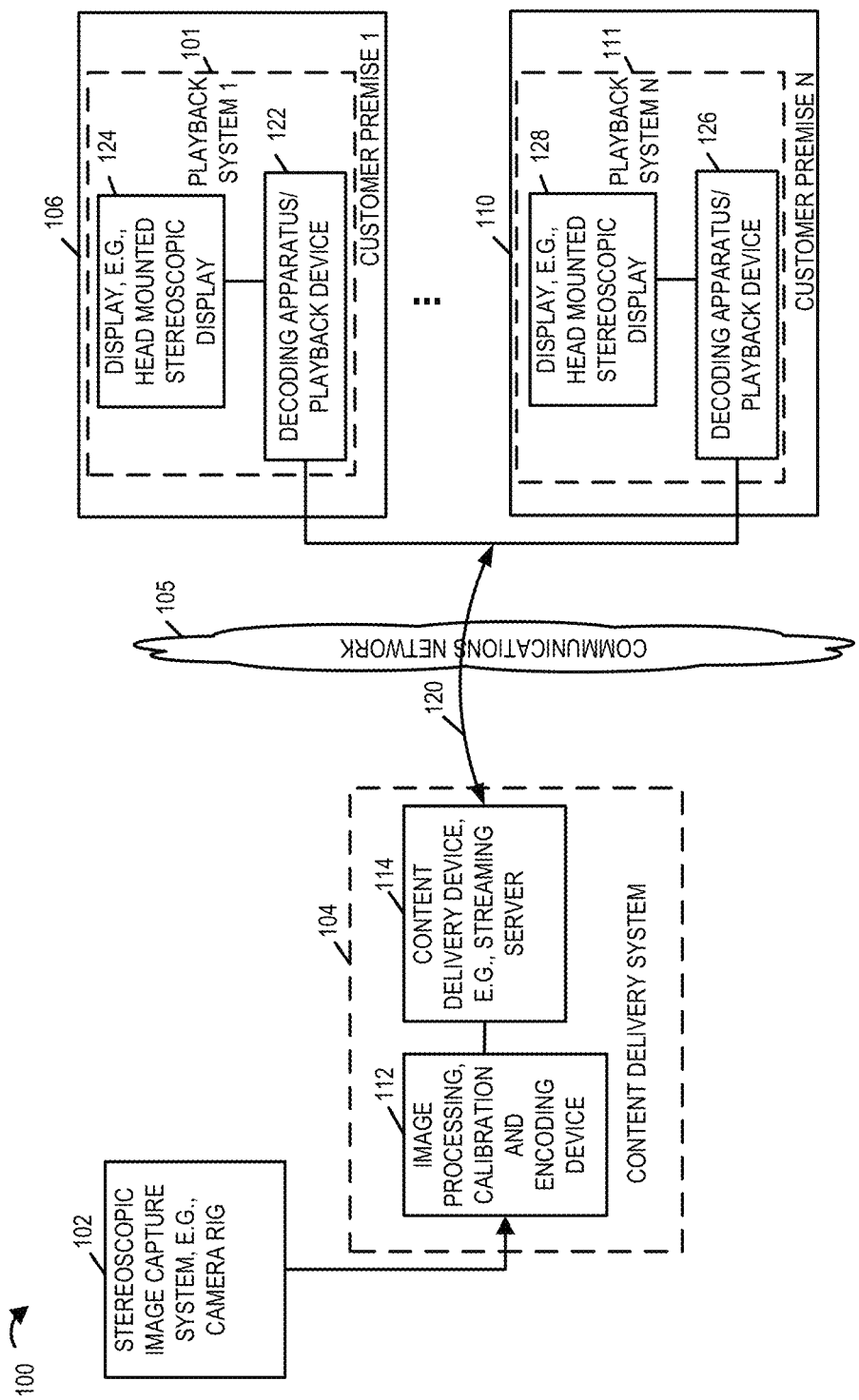
FIG. 1 illustrates an exemplary system implemented in accordance with some embodiments of the invention which can be used to capture, stream content, and output content to one or more users.

FIG. 1 illustrates an exemplary system 100 implemented in accordance with some embodiments of the invention. The system 100 supports content delivery, e.g., imaging content delivery, to one or more customer devices, e.g., playback devices/content players, located at customer premises. The system 100 includes the exemplary image capturing device 102, a content delivery system 104, a communications network 105, and a plurality of customer premises 106, . . . , 110. The image capturing device 102 supports capturing of stereoscopic imagery. The image capturing device 102 captures and processes imaging content in accordance with the features of the invention. The communications network 105 may be, e.g., a hybrid fiber-coaxial (HFC) network, satellite network, and/or internet.

The content delivery system 104 includes an image processing, calibration and encoding apparatus 112 and a content delivery device 114, e.g. a streaming server 114. The image processing, calibration and encoding apparatus 112 is responsible for performing a variety of functions including camera calibration based on one or more target images and/or grid patterns captured during a camera calibration process, generation of a distortion correction or compensation mesh which can be used by a playback device to compensate for distortions introduced by a calibrated camera, processing, e.g., cropping and encoding of captured images, and supplying calibration and/or environmental information to the content delivery device 114 which can be supplied to a playback device and used in the rendering/image playback process. Content delivery device 114 may be implemented as a server with, as will be discussed below, the delivery device responding to requests for content with image calibration information, optional environment information, and one or more images captured by the camera rig 102 which can be used in simulating a 3D environment. Streaming of images and/or content may be, and sometimes is, a function of feedback information such as viewer head position and/or user selection of a position at the event corresponding to a camera rig 102 which is to be the source of the images. For example, a user may select or switch between images from a camera rig positioned at center line to a camera rig positioned at the field goal with the simulated 3D environment and streamed images being changed to those corresponding to the user selected camera rig. Thus it should be appreciated that although a single camera rig 102 is shown in FIG. 1, multiple camera rigs may be present in the system and located at different physical locations at a sporting or other event with the user being able to switch between the different positions and with the user selections being communicated from the playback device 122 to the content server 114. While separate devices 112, 114 are shown in the image processing and content delivery system 104, it should be appreciated that the system may be implemented as a single device including separate hardware for performing the various functions or with different functions being controlled by different software or hardware modules but being implemented in or on a single processor.

The encoding apparatus 112 may, and in some embodiments does, include one or a plurality of encoders for encoding image data in accordance with the invention. The encoders may be used in parallel to encode different portions of a scene and/or to encode a given portion of a scene to generate encoded versions which have different data rates. Using multiple encoders in parallel can be particularly useful when real time or near real time streaming is to be supported.

The content streaming device 114 is configured to stream, e.g., transmit, encoded content to deliver the encoded image content to one or more customer devices, e.g., over the communications network 105. Via the network 105, the content delivery system 104 can send and/or exchange information with the devices located at the customer premises 106, 110 as represented in the figure by the link 120 traversing the communications network 105.

While the encoding apparatus 112 and content delivery server 114 are shown as separate physical devices in the FIG. 1 example, in some embodiments they are implemented as a single device which encodes and streams content. The encoding process may be a 3d, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premise 106, 110 may include a plurality of playback systems, e.g., devices/players, e.g., apparatus that can decode and playback/display the imaging content streamed by the content streaming device 114. Customer premise 1 106 includes a playback system 101 that includes a decoding apparatus/playback device 122 coupled to a display device 124. Customer premise N 110 includes a playback system 111 including a decoding apparatus/playback device 126 coupled to a display device 128. In some embodiments the display devices 124, 128 are head mounted stereoscopic display devices. In various embodiments the playback system 101 is a headmounted system supported by a strap that is worn around the user's head. Thus, in some embodiments, customer premise 1 106 includes playback system 1 101 which includes decoding apparatus/playback device 122 coupled to display 124, e.g., a head mounted stereoscopic display, and customer premise N 110 includes playback system N 111 which includes decoding apparatus/playback device 126 coupled to display 128, e.g., a head mounted stereoscopic display, In various embodiments decoding apparatus 122, 126 present the imaging content on the corresponding display devices 124, 128. The decoding apparatus/players 122, 126 may be devices which are capable of decoding the imaging content received from the content delivery system 104, generate imaging content using the decoded content and rendering the imaging content, e.g., 3D image content, on the display devices 124, 128. Any of the decoding apparatus/playback devices 122, 126 may be used as the decoding apparatus/playback device 800 shown in FIG. 3. A system/playback device such as the one illustrated in FIG. 3 can be used as any of the decoding apparatus/playback devices 122, 126.

Figure 2:
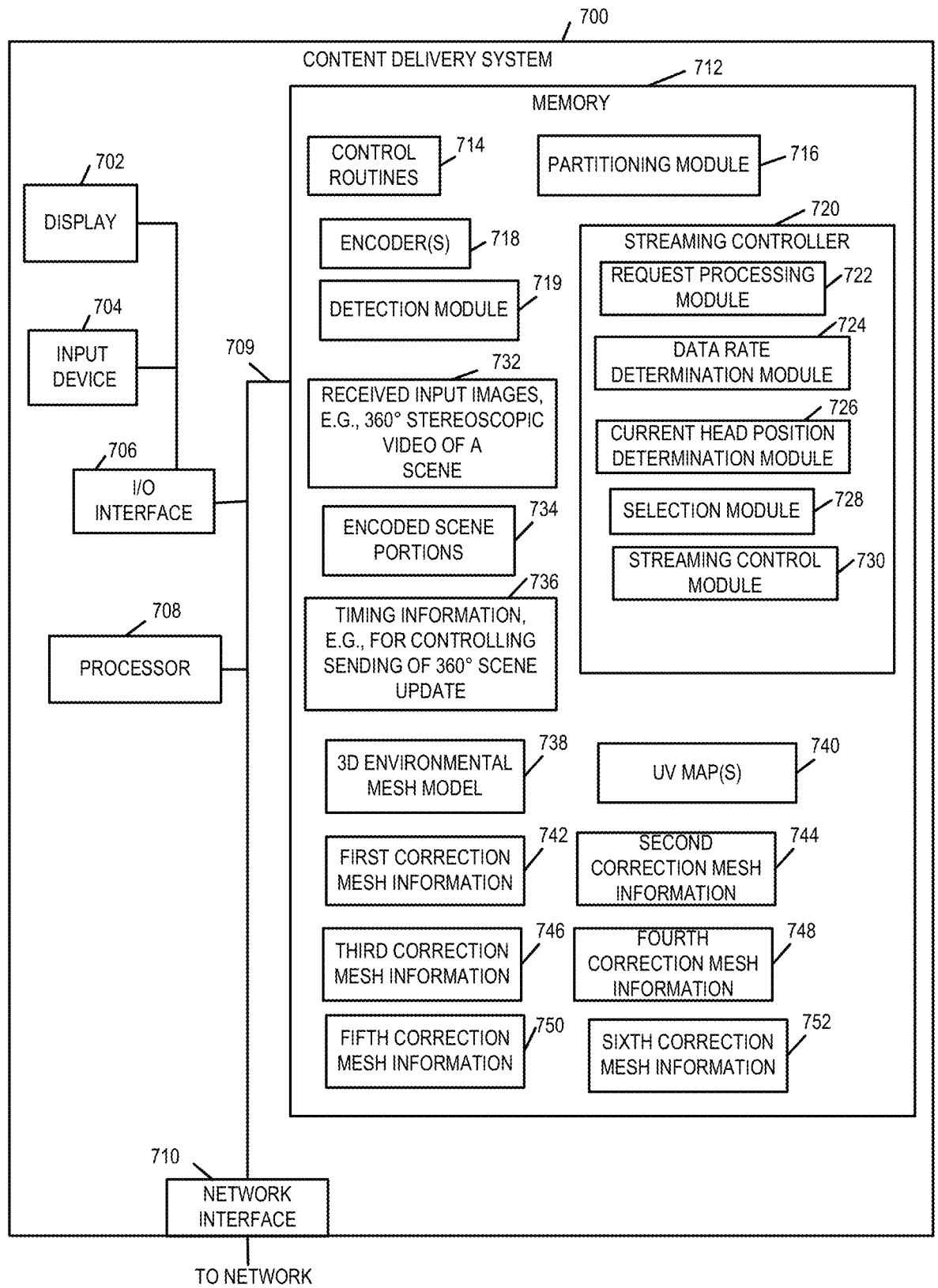
FIG. 2 illustrates an exemplary content delivery system with encoding capability that can be used to encode and stream content in accordance with the features of the invention.

FIG. 2 illustrates an exemplary content delivery system 700 with encoding capability that can be used to encode and stream content in accordance with the features of the invention.

The system 700 may be used to perform object detection, encoding, storage, and transmission and/or content output in accordance with the features of the invention. The content delivery system 700 may be used as the system 104 of FIG. 1. While the system shown in FIG. 2 is used for encoding, processing and streaming of content, it should be appreciated that the system 700 may also include the ability to decode and display processed and/or encoded image data, e.g., to an operator.

The system 700 includes a display 702, input device 704, input/output (I/O) interface 706, a processor 708, network interface 710 and a memory 712. The various components of the system 700 are coupled together via bus 709 which allows for data to be communicated between the components of the system 700.

The memory 712 includes various modules, e.g., routines, which when executed by the processor 708 control the system 700 to implement the partitioning, encoding, storage, and streaming/transmission and/or output operations in accordance with the invention.

The memory 712 includes various modules, e.g., routines, which when executed by the processor 707 control the content delivery system 700 to implement the immersive stereoscopic video acquisition, encoding, storage, and transmission and/or output methods in accordance with the invention. The memory 712 includes control routines 714, a partitioning module 706, encoder(s) 718, a detection module 719, a streaming controller 720, received input images 732, e.g., 360 degree stereoscopic video of a scene, encoded scene portions 734, timing information 736, an environmental mesh model 738, UV maps(s) 740 and a plurality of correction mesh information sets including first correction mesh information 742, second correction mesh information 744, third correction mesh information 746, fourth correction mesh information 748, fifth correction mesh information 750 and sixth correction mesh information 752. In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

The control routines 714 include device control routines and communications routines to control the operation of the system 700. The partitioning module 716 is configured to partition a received stereoscopic 360 degree version of a scene into N scene portions in accordance with the features of the invention.

The encoder(s) 718 may, and in some embodiments do, include a plurality of encoders configured to encode received image content, e.g., 360 degree version of a scene and/or one or more scene portions in accordance with the features of the invention. In some embodiments encoder(s) include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 718 is the encoded scene portions 734 which are stored in the memory for streaming to customer devices, e.g., playback devices. The encoded content can be streamed to one or multiple different devices via the network interface 710.

The detection module 719 is configured to detect a network controlled switch from streaming content from a current camera pair, e.g., first stereoscopic camera pair, to another camera pair, e.g., a second or third stereoscopic camera pair. That is the detection module 719 detects if the system 700 has switched from streaming content stream generated using images captured by a given stereoscopic camera pair, e.g., a first stereoscopic camera pair, to streaming content stream generated using images captured by another camera pair. In some embodiments the detection module 719 is further configured to detect a user controlled change from receiving a first content stream including content from the first stereoscopic camera pair to receiving a second content stream including content from the second stereoscopic camera pair, e.g., detecting a signal from user playback device indicating that the playback device is attached to a different content stream than a content to which it was attached previously. The streaming controller 720 is configured to control streaming of encoded content for delivering the encoded image content to one or more customer devices, e.g., over the communications network 105.

The streaming controller 720 includes a request processing module 722, a data rate determination module 724, a current head position determination module 726, a selection module 728 and a streaming control module 730. The request processing module 722 is configured to process a received request for imaging content from a customer playback device. The request for content is received in various embodiments via a receiver in the network interface 710. In some embodiments the request for content includes information indicating the identity of requesting playback device. In some embodiments the request for content may include data rate supported by the customer playback device, a current head position of the user, e.g., position of the head mounted display. The request processing module 722 processes the received request and provides retrieved information to other elements of the streaming controller 720 to take further actions. While the request for content may include data rate information and current head position information, in various embodiments the data rate supported by the playback device can be determined from network tests and other network information exchange between the system 700 and the playback device.

The data rate determination module 724 is configured to determine the available data rates that can be used to stream imaging content to customer devices, e.g., since multiple encoded scene portions are supported the content delivery system 700 can support streaming content at multiple data rates to the customer device. The data rate determination module 724 is further configured to determine the data rate supported by a playback device requesting content from system 700. In some embodiments the data rate determination module 724 is configured to determine available data rate for delivery of image content based on network measurements.

The current head position determination module 726 is configured to determine a current viewing angle and/or a current head position of the user, e.g., position of the head mounted display, from information received from the playback device. In some embodiments the playback device periodically sends current head position information to the system 700 where the current head position determination module 726 receives and processes the information to determine the current viewing angle and/or a current head position.

The selection module 728 is configured to determine which portions of a 360 degree scene to stream to a playback device based on the current viewing angle/head position information of the user. The selection module 728 is further configured to select the encoded versions of the determined scene portions based on available data rate to support streaming of content.

The streaming control module 730 is configured to control streaming of image content, e.g., multiple portions of a 360 degree stereoscopic scene, at various supported data rates in accordance with the features of the invention. In some embodiments the streaming control module 730 is configured to control stream N portions of a 360 degree stereoscopic scene to the playback device requesting content to initialize scene memory in the playback device. In various embodiments the streaming control module 730 is configured to send the selected encoded versions of the determined scene portions periodically, e.g., at a determined rate. In some embodiments the streaming control module 730 is further configured to send 360 degree scene update to the playback device in accordance with a time interval, e.g., once every minute. In some embodiments sending 360 degree scene update includes sending N scene portions or N-X scene portions of the full 360 degree stereoscopic scene, where N is the total number of portions into which the full 360 degree stereoscopic scene has been partitioned and X represents the selected scene portions recently sent to the playback device. In some embodiments the streaming control module 730 waits for a predetermined time after initially sending N scene portions for initialization before sending the 360 degree scene update. In some embodiments the timing information to control sending of the 360 degree scene update is included in the timing information 736. In some embodiments the streaming control module 730 is further configured identify scene portions which have not been transmitted to the playback device during a refresh interval; and transmit an updated version of the identified scene portions which were not transmitted to the playback device during the refresh interval.

In various embodiments the streaming control module 730 is configured to communicate at least a sufficient number of the N portions to the playback device on a periodic basis to allow the playback device to fully refresh a 360 degree version of said scene at least once during each refresh period.

Figure 4:
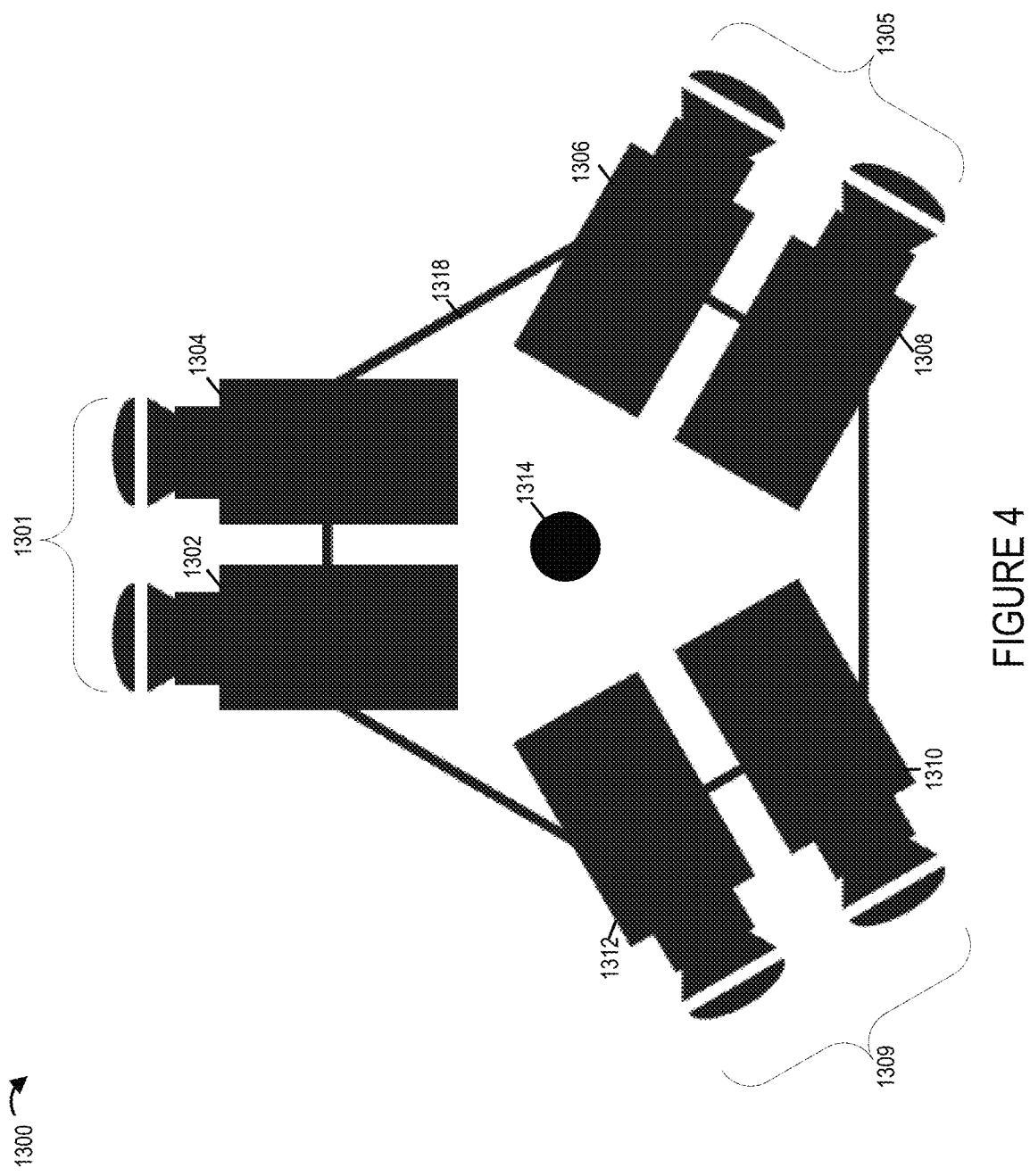
FIG. 4 illustrates a camera rig including multiple camera pairs for capturing left and right eye images corresponding to different 120 degree sectors of a 360 degree field of view along with a camera or cameras directed towards the sky to capture a sky view.

In some embodiments streaming controller 720 is configured to control the system 700 to transmit, e.g., via a transmitter in the network interface 710, a stereoscopic content stream (e.g., encoded content stream 734) including encoded images generated from image content captured by one or more cameras, e.g., cameras of stereoscopic camera pairs such as illustrated in FIG. 4. In some embodiments streaming controller 720 is configured to control the system 700 to transmit, to one or more playback devices, an environmental mesh model 738 to be used in rendering image content. In some embodiments streaming controller 720 is further configured to transmit to a playback device a first UV map to be used for mapping portions of images captured by a first stereoscopic camera pair to a portion of the environmental mesh model as part of an image rendering operation.

In various embodiments the streaming controller 720 is further configured to provide (e.g., transmit via a transmitter in the network interface 710) one or more sets of correction mesh information, e.g., first, second, third, fourth, fifth, sixth, correction mesh information (742, 744, 746, 748, 750, 752) to a playback device. In some embodiments the first correction mesh information 742 is for use in rendering image content captured by a first camera of a first stereoscopic camera pair, the second correction mesh information 744 is for use in rendering image content captured by a second camera of the first stereoscopic camera pair, the third correction mesh information 746 is for use in rendering image content captured by a first camera of a second stereoscopic camera pair, the fourth correction mesh information 748 is for use in rendering image content captured by a second camera of the second stereoscopic camera pair, the fifth correction mesh information 750 is for use in rendering image content captured by a first camera of a third stereoscopic camera pair, the sixth correction mesh information 752 is for use in rendering image content captured by a second camera of the third stereoscopic camera pair. In some embodiments the streaming controller 720 is further configured to indicate, e.g., by sending a control signal, to the playback device that the third and fourth correction mesh information (746, 748) should be used when content captured by the second stereoscopic camera pair is streamed to the playback device instead of content from the first stereoscopic camera pair. In some embodiments the streaming controller 720 is further configured to indicate to the playback device that the third and fourth correction mesh information (746, 748) should be used in response to the detection module 719 detecting i) a network controlled switch from streaming content from said first stereoscopic camera pair to said second stereoscopic pair or ii) a user controlled change from receiving a first content stream including content from said first stereoscopic camera pair to receiving a second content stream including encoded content from the second stereoscopic camera pair.

The memory 712 further includes the environmental mesh model 738, UV map(s) 740, and sets of correction mesh information including first correction mesh information 742, second correction mesh information 744, third correction mesh information 746, fourth correction mesh information 748, fifth correction mesh information 750 and sixth correction mesh information 752. The system 700 provides the environmental mesh model 738 to one or more playback devices for use in rendering image content. The UV map(s) 740 include at least a first UV map to be used for mapping portions of images captured by the first stereoscopic camera pair to a portion of the environmental mesh model 738 as part of an image rendering operation. The first correction mesh information 742 includes information generated based on measurement of one or more optical characteristics of a first lens of said first camera of the first stereoscopic camera pair and the second mesh correction information 744 includes information generated based on measurement of one or more optical characteristic of a second lens of said second camera of the first stereoscopic camera pair. In some embodiments the first and second stereoscopic camera pairs correspond to a forward viewing direction but different locations at an area or event location where content is being captured for streaming.

Figure 9:
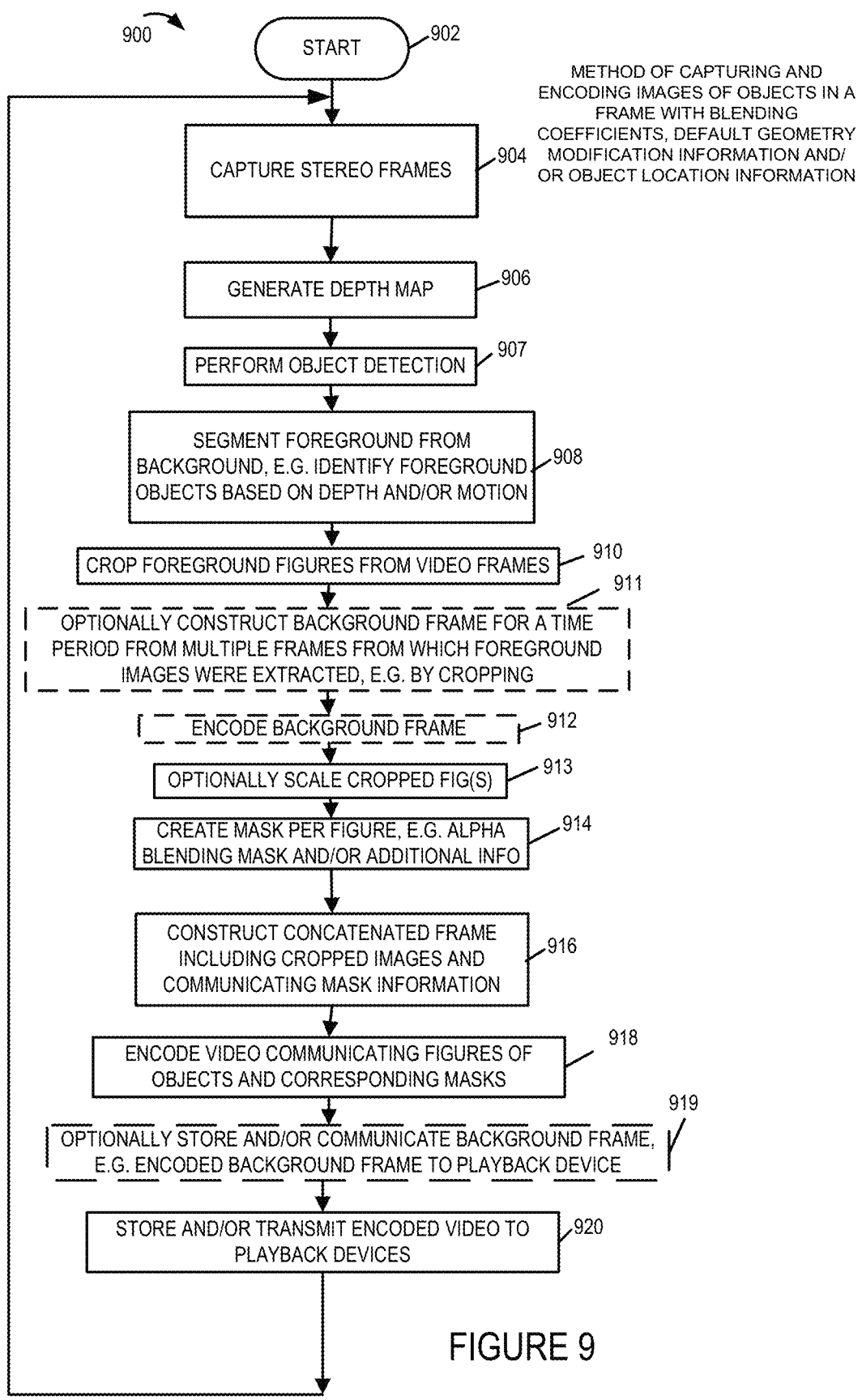
FIG. 9 shows the steps of a method of generating and communicating encoded frames providing foreground object textures and corresponding information which is performed by a content delivery system in some embodiments.

In some embodiments the processor 708 is configured to perform the various functions corresponding to the steps discussed in flowchart 900 of FIG. 9 and/or a flowchart of FIG. 13. In some embodiments the processor 708 uses routines and information stored in memory 712 to perform various functions and control the system 700 to operate in accordance with the methods of the present invention. In one embodiments the processor 708 is configured to control the system to provide the first correction mesh information and the second correction mesh information to a playback device, the first correction mesh information being for use in rendering image content captured by the first camera, the second correction mesh information being for use in rendering image content captured by the second camera. In some embodiments the first stereoscopic camera pair corresponds to a first direction and the processor 708 is further configured to control the system 700 to transmit a stereoscopic content stream including encoded images generated from image content captured by the first and second cameras. In some embodiments the processor 708 is further configured to transmit to the playback device an environmental mesh model 738 to be used in rendering image content. In some embodiments the processor 708 is further configured to transmit to the playback device a first UV map 740 to be used for mapping portions of images captured by the first stereoscopic camera pair to a portion of the environmental mesh model as part of an image rendering operation. In some embodiments the processor 708 is further configured to control the system 700 to provide third correction mesh information 746 and fourth correction mesh information 748 to the playback device, the third correction mesh information 746 being for use in rendering image content captured by a first camera of a second stereoscopic camera pair, the fourth correction mesh information 748 being for use in rendering image content captured by a second camera of the second stereoscopic camera pair. In some embodiments the processor 708 is further configured to control the system 700 to indicate (e.g., transmit via network interface 710) to the playback device that the third and fourth correction mesh information (746, 748) should be used when content captured by the second camera pair is streamed to the playback device instead of content from the first camera pair. In some embodiments the processor 708 is further configured to control the system 700 to indicate to the playback device that the third and fourth correction mesh information (746, 748) should be used in response to the system detecting: i) a network controlled switch from streaming content from the first stereoscopic camera pair to the second stereoscopic pair or ii) a user controlled change from receiving a first content stream including content from the first stereoscopic camera pair to receiving a second content stream including encoded content from the second stereoscopic camera pair. In some embodiments the processor 708 is further configured to control the system 700 to system to provide the fifth and sixth correction mesh information (750, 752) to the playback device, the fifth correction mesh information 750 being for use in rendering image content captured by the first camera of the third stereoscopic camera pair, the sixth correction mesh information 752 being for use in rendering image content captured by the second camera of the third stereoscopic camera pair.

Figure 3:
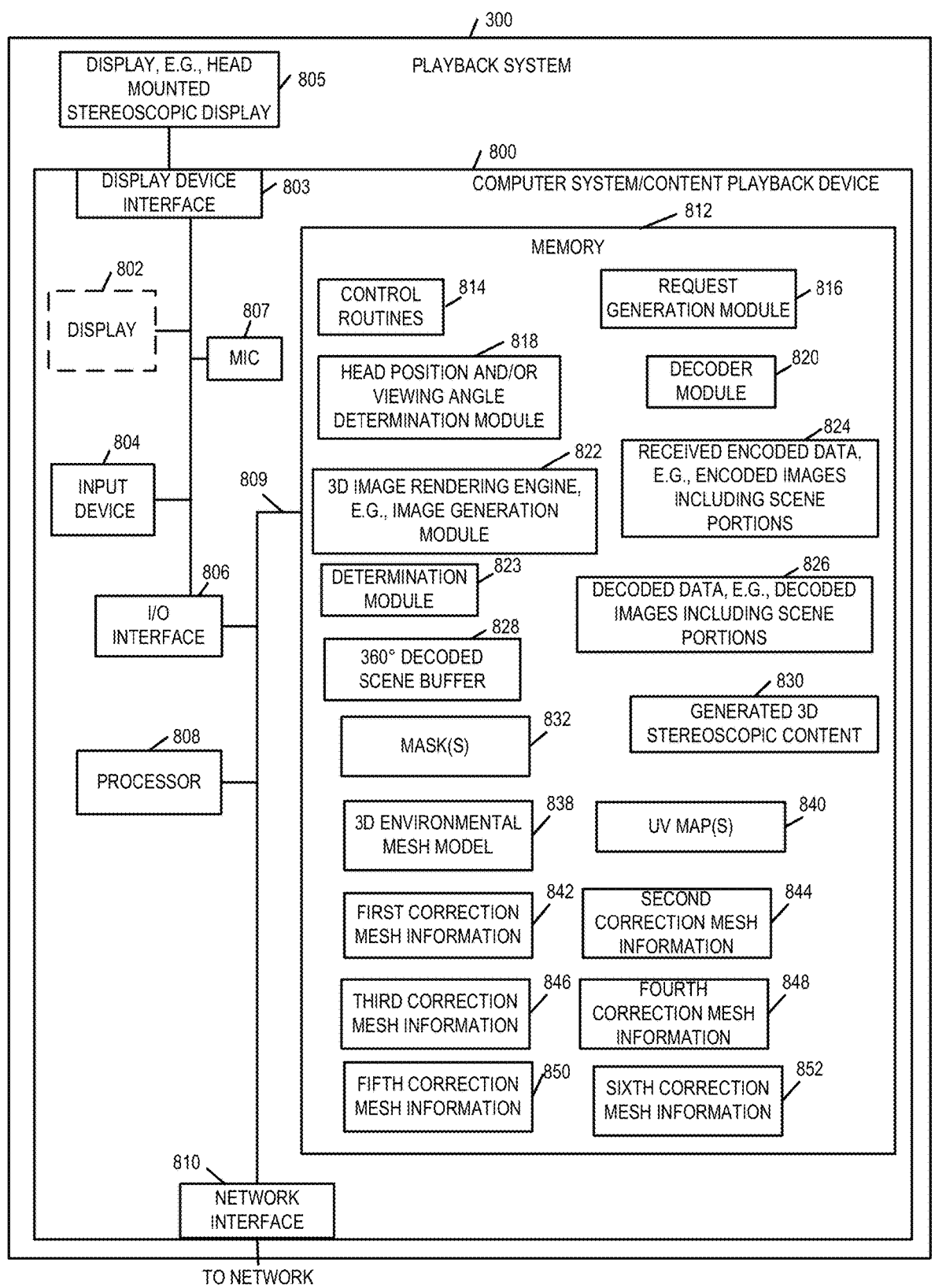
FIG. 3 illustrates an exemplary content playback system that can be used to receive, decode and display the content streamed by the system of FIG. 2.

FIG. 3 illustrates a playback system 300 implemented in accordance with an exemplary embodiment of the present invention. Playback system 300 is, e.g., playback system 101 or playback system 111 of FIG. 1. Exemplary playback system 300 includes computer system/playback device 800 coupled to display 805, e.g., a head mounted stereoscopic display. Computer system/playback device 800 implemented in accordance with the present invention can be used to receive, decode, store and display imaging content received from a content delivery system such as the one shown in FIGS. 1 and 2. The playback device may be used with a 3D head mounted display such as the OCULUS RIFTTM VR (virtual reality) headset which may be the head mounted display 805. The device 800 includes the ability to decode the received encoded image data and generate 3D image content for display to the customer. The playback device 800 in some embodiments is located at a customer premise location such as a home or office but may be located at an image capture site as well. The device 800 can perform signal reception, decoding, display and/or other operations in accordance with the invention.

The device 800 includes a display 802, a display device interface 803, input device 804, microphone (mic) 807, input/output (I/O) interface 806, a processor 808, network interface 810 and a memory 812. The various components of the playback device 800 are coupled together via bus 809 which allows for data to be communicated between the components of the system 800. While in some embodiments display 802 is included as an optional element as illustrated using the dashed box, in some embodiments an external display device 805, e.g., a head mounted stereoscopic display device, can be coupled to the playback device via the display device interface 803.

Via the I/O interface 806, the system 800 can be coupled to external devices to exchange signals and/or information with other devices. In some embodiments via the I/O interface 806 the system 800 can receive information and/or images from an external device and output information and/or images to external devices. In some embodiments via the interface 806 the system 800 can be coupled to an external controller, e.g., such as a handheld controller.

The processor 808, e.g., a CPU, executes routines 814 and modules in memory 812 and uses the stored information to control the system 800 to operate in accordance with the invention. The processor 808 is responsible for controlling the overall general operation of the system 800. In various embodiments the processor 808 is configured to perform functions that have been discussed as being performed by the playback system 800.

Via the network interface 810 the system 800 communicates and/or receives signals and/or information (e.g., including encoded images and/or video content corresponding to a scene) to/from various external devices over a communications network, e.g., such as communications network 105. In some embodiments the system receives one or more content streams including encoded images captured by one or more different cameras via the network interface 810 from the content delivery system 700. The received content stream may be stored as received encoded data, e.g., encoded images 824. In some embodiments the interface 810 is configured to receive a first encoded image including image content captured by a first camera and a second encoded image corresponding to a second camera. The network interface 810 includes a receiver and a transmitter via which the receiving and transmitting operations are performed. In some embodiments the interface 810 is configured to receive correction mesh information corresponding to a plurality of different cameras including first correction mesh information 842, second correction mesh information 844, third correction mesh information 846, fourth correction mesh information 848, fifth correction mesh information 850 and sixth correction mesh information 852 which are then stored in memory 812. Furthermore in some embodiments via the interface 810 the system receives one or more mask(s) 832, an environmental mesh model 838, UV maps(s) 840 which are then stored in memory 812.

The memory 812 includes various modules, e.g., routines, which when executed by the processor 808 control the playback device 800 to perform decoding and output operations in accordance with the invention. The memory 812 includes control routines 814, a request for content generation module 816, a head position and/or viewing angle determination module 818, a decoder module 820, a stereoscopic image rendering engine 822 also referred to as a 3D image generation module, a determination module 823, and data/information including received encoded image content 824, decoded image content 826, a 360 degree decoded scene buffer 828, generated stereoscopic content 830, mask (s) 832, an environmental mesh model 838, UV maps(s) 840 and a plurality of received correction mesh information sets including first correction mesh information 842, second correction mesh information 844, third correction mesh information 846, fourth correction mesh information 848, fifth correction mesh information 850 and sixth correction mesh information 852.

The control routines 814 include device control routines and communications routines to control the operation of the device 800. The request generation module 816 is configured to generate a request for content to send to a content delivery system for providing content. The request for content is sent in various embodiments via the network interface 810. The head position and/or viewing angle determination module 818 is configured to determine a current viewing angle and/or a current head position of the user, e.g., position of the head mounted display, and report the determined position and/or viewing angle information to the content delivery system 700. In some embodiments the playback device 800 periodically sends current head position information to the system 700.

The decoder module 820 is configured to decode encoded image content 824 received from the content delivery system 700 to produce decoded image data, e.g., decoded images 826. The decoded image data 826 may include decoded stereoscopic scene and/or decoded scene portions. In some embodiments the decoder 820 is configured to decode the first encoded image to generate a first decoded image and decode the second received encoded image to generate a second decoded image. The decoded first and second images are included in the stored decoded image images 826.

The 3D image rendering engine 822 performs the rendering operations (e.g., using content and information received and/or stored in memory 812 such as decoded images 826, environmental mesh model 838, UV map(s) 840, masks 832 and mesh correction information) and generates 3D image in accordance with the features of the invention for display to the user on the display 802 and/or the display device 805. The generated stereoscopic image content 830 is the output of the 3D image generation engine 822. In various embodiments the rendering engine 822 is configured to perform a first rendering operation using the first correction information 842, the first decoded image and the environmental mesh model 838 to generate a first image for display. In various embodiments the rendering engine 822 is further configured to perform a second rendering operation using the second correction information 844, the second decoded image and the environmental mesh model 838 to generate a second image for display. In some such embodiments the rendering engine 822 is further configured to use a first UV map (included in received UV map(s) 840) to perform the first and second rendering operations. The first correction information provides information on corrections to be made to node positions in the first UV map when the first rendering operation is performed to compensate for distortions introduced into the first image by a lens of the first camera and the second correction information provides information on corrections to be made to node positions in the first UV map when the second rendering operation is performed to compensate for distortions introduced into the second image by a lens of the second camera. In some embodiments the rendering engine 822 is further configured to use a first mask (included in mask(s) 832) to determine how portions of the first image are combined with portions of a first image corresponding to a different field of view as part of the first rendering operation when applying portions of the first image to a surface of the environmental mesh model as part of the first rendering operation. In some embodiments the rendering engine 822 is further configured to use the first mask to determine how portions of the second image are combined with a portions of a second image corresponding to the different field of view as part of the second rendering operation when applying portions of the second image to the surface of the environmental mesh model as part of the second rendering operation. The generated stereoscopic image content 830 includes the first and second images (e.g., corresponding to left and right eye views) generated as a result of the first and second rendering operation. In some embodiments the portions of a first image corresponding to a different field of view correspond to a sky or ground field of view. In some embodiments the first image is a left eye image corresponding to a forward field of view and the first image corresponding to a different field of view is a left eye image captured by a third camera corresponding to a side field of view adjacent the forward field of view. In some embodiments the second image is a right eye image corresponding to a forward field of view and wherein the second image corresponding to a different field of view is a right eye image captured by a fourth camera corresponding to a side field of view adjacent the forward field of view. Thus the rendering engine 822 renders the 3D image content 830 to the display. In some embodiments the operator of the playback device 800 may control one or more parameters via input device 804 and/or select operations to be performed, e.g., select to display 3D scene.

The network interface 810 allows the playback device to receive content from the streaming device 114 and/or communicate information such as view head position and/or position (camera rig) selection indicating selection of particular viewing position at an event. In some embodiments the decoder 820 is implemented as a module. In such embodiments when executed the decoder module 820 causes received images to be decoded while 3D image rendering engine 822 causes further processing of the images in accordance with the present invention and optionally stitching of images together as part of the presentation process.

In some embodiments the interface 810 is further configured to receive additional mesh correction information corresponding to a plurality of different cameras, e.g., third, fourth, fifth and sixth mesh correction information. In some embodiments the rendering engine 822 is further configured to use mesh correction information corresponding to a fourth camera (e.g., fourth mesh correction information 848) when rendering an image corresponding to a fourth camera, the fourth camera being one of the plurality of different cameras. The determination module 823 is configured to determine which mesh correction information is to be used by the rendering engine 822 when performing a rendering operation based on which camera captured image content is being used in the rendering operation or based an indication from a server indicating which mesh correction information should be used when rendering images corresponding to a received content stream. The determination module 823 may be implemented as part of the rendering engine 822 in some embodiments.

In some embodiments the modules and/or elements shown in the memory 712 of FIG. 2 and memory 812 of FIG. 3 are implemented as software modules. In other embodiments the modules and/or elements, while shown to be included in the memory, are implemented in hardware, e.g., as individual circuits with each element being implemented as a circuit for performing the function corresponding to the element. In still other embodiments the modules and/or elements are implemented using a combination of software and hardware.

While shown in FIGS. 2 and 3 to be included in the memory, the elements shown included in the system 700 and 800 can, and in some embodiments are, implemented fully in hardware within the processor, e.g., as individual circuits, of the corresponding device, e.g., within the processor 708 in case of the content delivery system and within the processor 808 in the case of playback system 800. In other embodiments some of the elements are implemented, e.g., as circuits, within the corresponding processors 708 and 808 with other elements being implemented, e.g., as circuits, external to and coupled to the processors. As should be appreciated the level of integration of modules on the processor and/or with some modules being external to the processor may be one of design choice. Alternatively, rather than being implemented as circuits, all or some of the elements may be implemented in software and stored in the memory, with the software modules controlling operation of the respective systems 700 and 800 to implement the functions corresponding to the modules when the modules are executed by their respective processors, e.g., processors 708 and 808. In still other embodiments, various elements are implemented as a combination of hardware and software, e.g., with a circuit external to the processor providing input to the processor which then under software control operates to perform a portion of a module's function.

Figure 7:
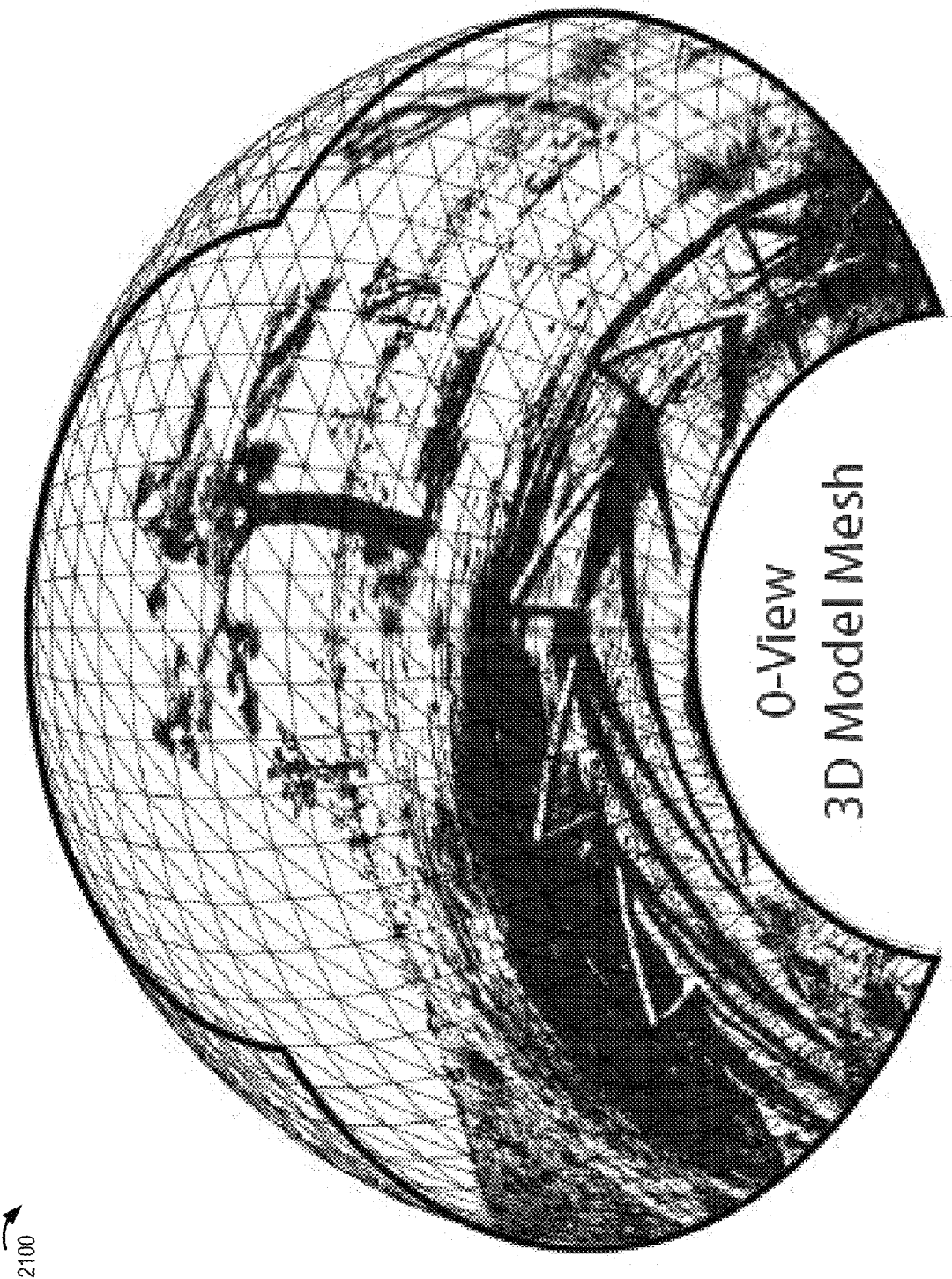
FIG. 7 shows an environmental mesh model corresponding to one sector of the camera rig with one of the images applied, e.g., projected, onto the environmental mesh to generate a background image.
Figure 8:
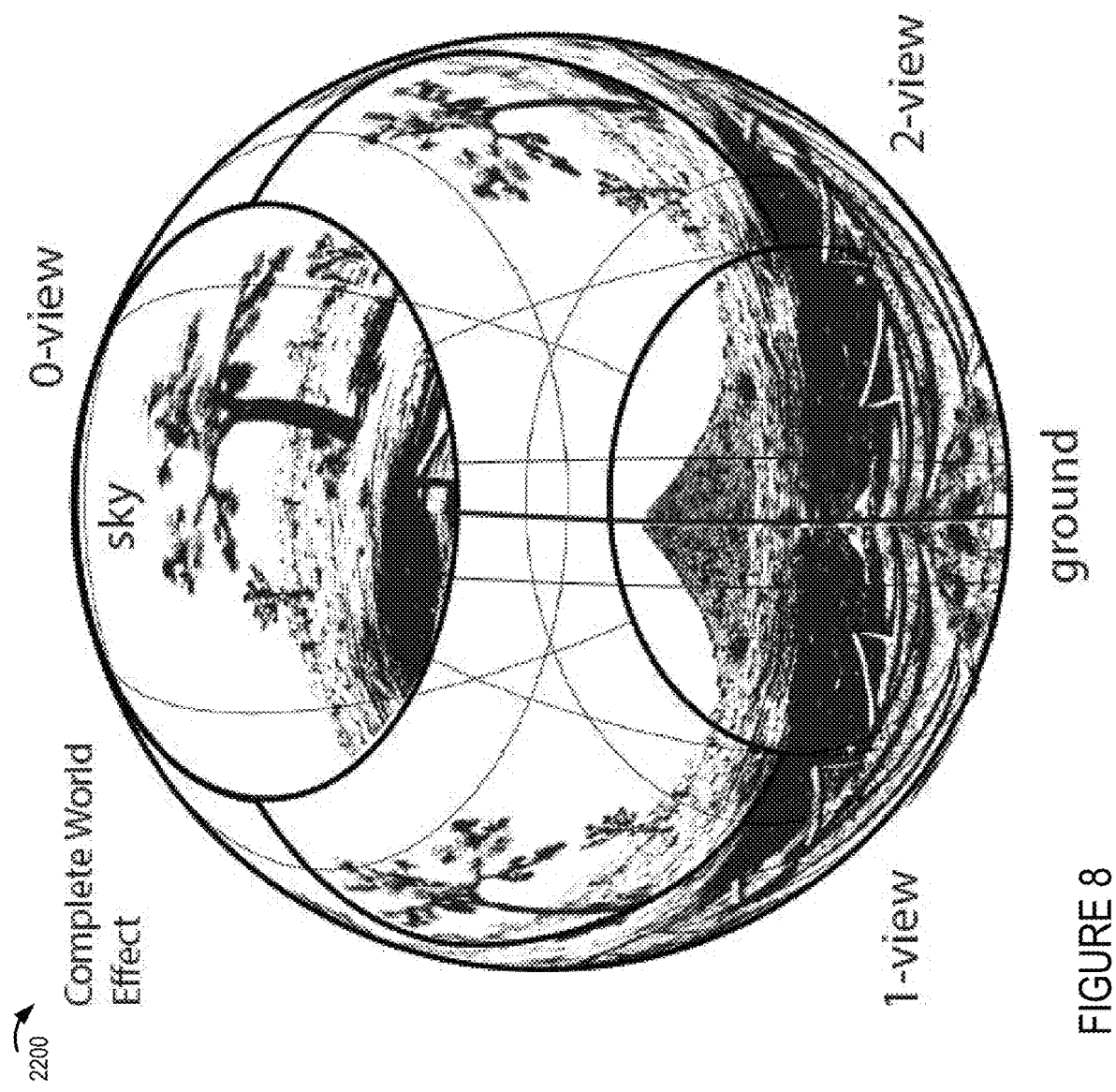
FIG. 8 shows application of images captured by cameras corresponding each of the sectors as well as the sky and ground cameras of the camera rig to simulate a complete 3D environment in the form of a sphere which can be used as a background to which foreground objects can be applied.

While shown in each of FIGS. 2 and 3 embodiments as a single processor, e.g., computer, it should be appreciated that each of the processors 708 and 808 may be implemented as one or more processors, e.g., computers. When one or more elements in the memory 712 and 812 are implemented as software modules, the modules include code, which when executed by the processor of the corresponding system (e.g., processor 708 and 808) configure the processor to implement the function corresponding to the module. In embodiments where the various modules shown in FIGS. 7 and 8 are stored in memory, the memory is a computer program product comprising a computer readable medium comprising code, e.g., individual code for each module, for causing at least one computer, e.g., processor, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 2 control and/or configure the system 700 or elements therein such as the processor 708, to perform the functions of corresponding steps of the methods of the present invention, e.g., such as those illustrated and/or described in the flowcharts. Similarly the modules illustrated in FIG. 3 control and/or configure the system 300 or 800 or elements therein such as the processor 808, to perform the functions of corresponding steps of the methods of the present invention, e.g., such as those illustrated and/or described in a flowchart.

To facilitate an understanding of the image capture process reference will now be made to the exemplary camera rig shown in FIG. 4. The camera rig 1300 can be used as the rig 102 of the FIG. 1 system and includes a plurality of stereoscopic camera pairs each corresponding to a different one of three sectors. The first stereoscopic camera pair 1301 includes a left eye camera 1302 (e.g., first camera) and a right camera 1304 (e.g., second camera) intended to capture images corresponding to those which would be seen by a left and right eye of a person positioned at the location of the first camera pair. Second stereoscopic camera pair 1305 corresponds to a second sector and includes left and right cameras 1306, 1308 while the third stereoscopic camera pair 1309 corresponds to a third sector includes left and right cameras 1310, 1312. Each camera is mounted in a fixed position in the support structure 1318. An upward facing camera 1314 is also included. A downward facing camera which is not visible in FIG. 4 may be included below camera 1314. Stereoscopic camera pairs are used in some embodiments to capture pairs of upward and downward images however in other embodiments a single upward camera and a single downward camera are used. In still other embodiments a downward image is captured prior to rig placement and used as a still ground image for the duration of an event. Such an approach tends to be satisfactory for many applications given that the ground view tends not to change significantly during an event. The output of the cameras of the rig 1300 are captured and processed.

Figure 5:
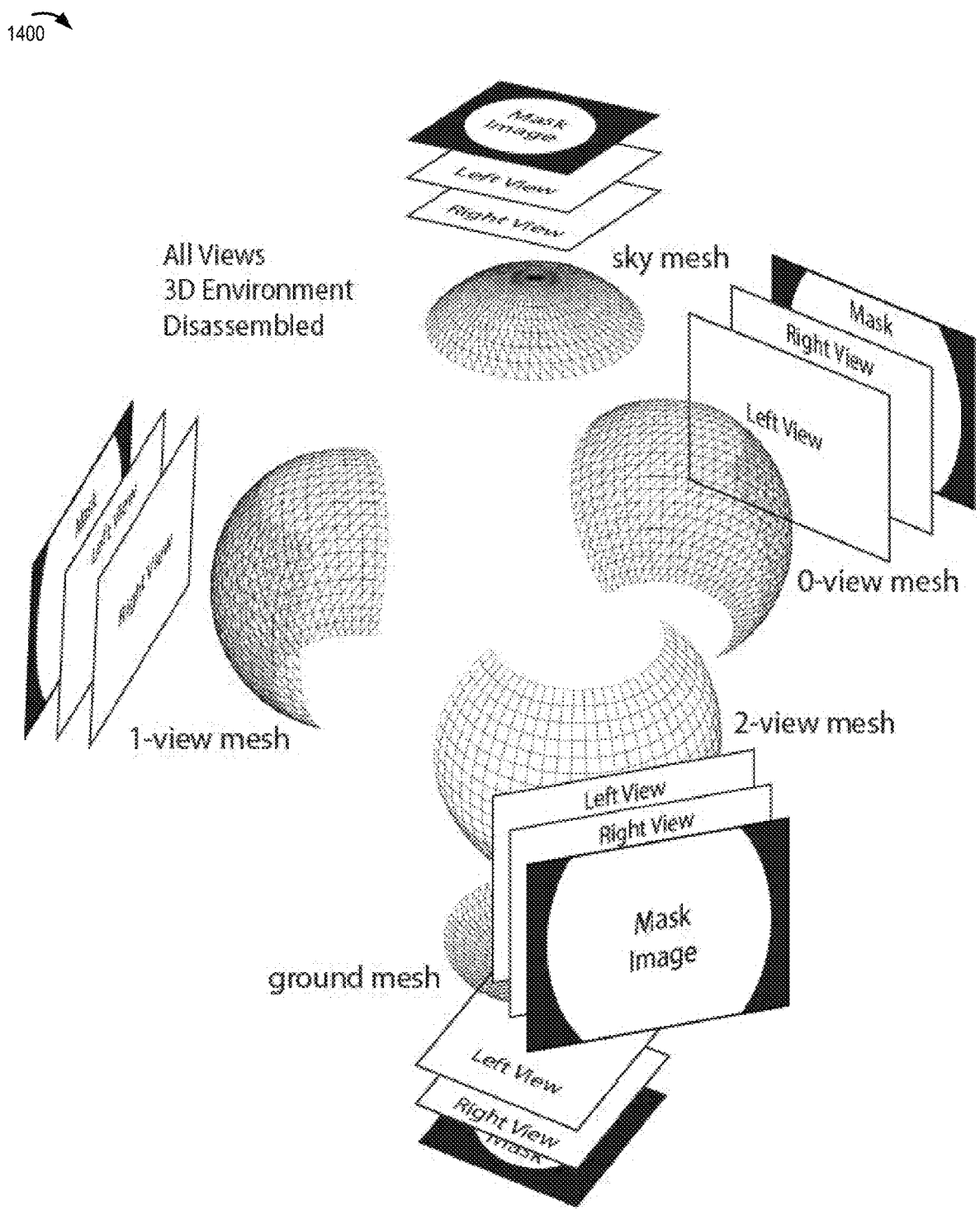
FIG. 5 shows how 5 different environmental mesh maps, corresponding to different camera views, can be combined to create a complete spherical view/environment onto which background images can be applied as part of a playback operation.

When the FIG. 4 camera rig 1300 is used each of the sectors corresponds to a known 120 degree viewing area with respect to the camera rig position, with the captured images from different sector pairs being seamed together based on the images know mapping to the simulated 3D environment. While a 120 degree portion of each image captured by a sector camera is normally used, the cameras capture a wider image corresponding to approximately a 180 degree viewing area. Accordingly, captured images may be subject to masking in the playback device as part of the 3D environmental simulation. FIG. 5 is a composite diagram 1400 showing how a 3D spherical environment can be simulated using environmental mesh portions which correspond to different camera pairs of the rig 102. Note that one mesh portion is shown for each of the sectors of the rig 102 with a sky mesh being used with regard to the top camera view and the ground mesh being used for the ground image captured by the downward facing camera. While the masks for the top and bottom images are round in nature, the masks applied to the sector images are truncated to reflect that top and bottom portions of the scene area will be supplied by the top and bottom cameras respectively.

Figure 6:
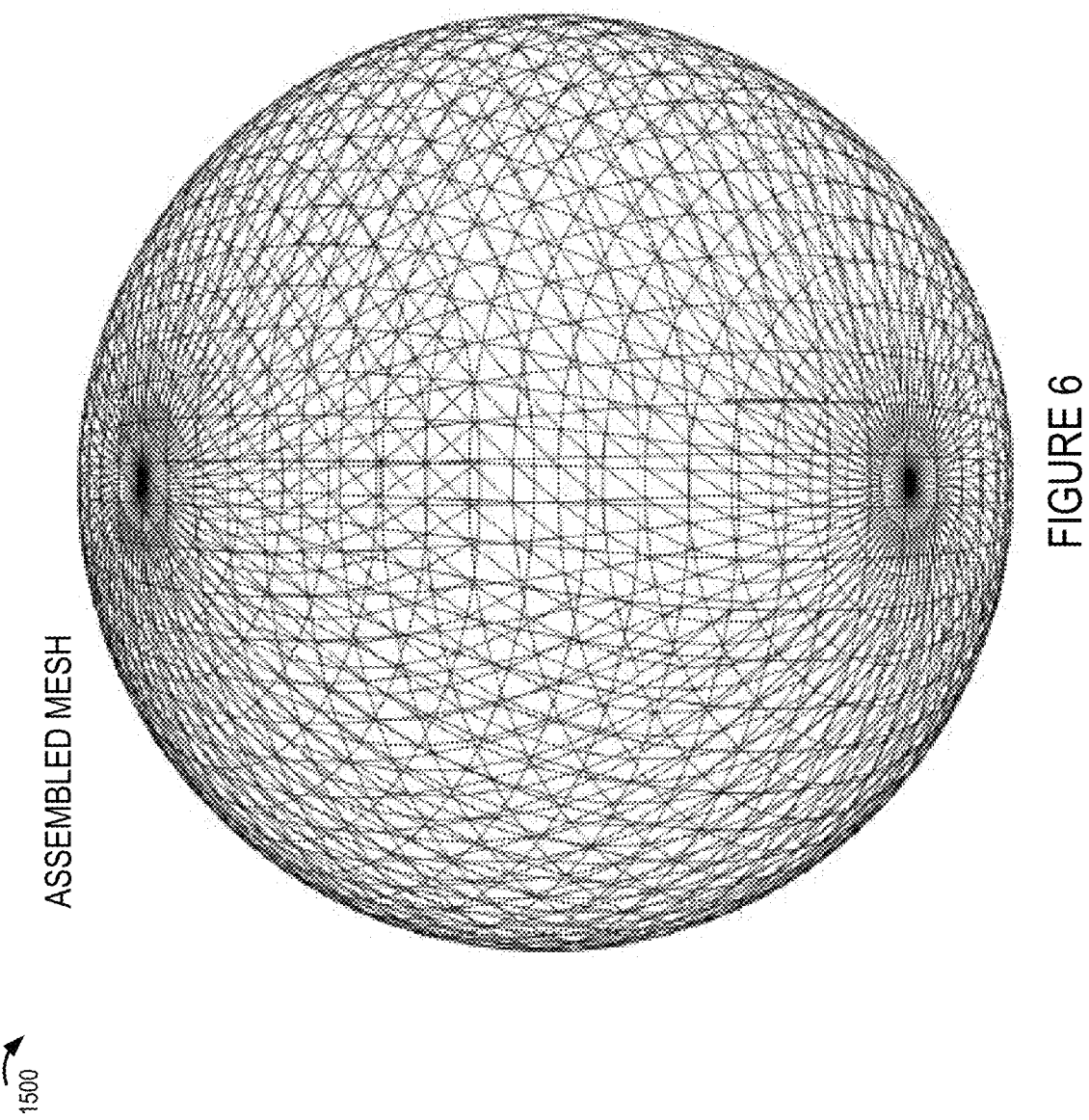
FIG. 6 shows the full assembly of 5 meshes to create a spherical simulated environment

When combined the overall meshes corresponding to different cameras results in a spherical mesh 1500 as shown in FIG. 6. Note that the mesh 1500 is shown for a single eye image but that it is used for both the left and right eye images in the case of stereoscopic image pairs being captured.

Mesh and masking information of the type shown in FIG. 5 can and sometimes is communicated to the playback device. The communicated information will vary depending on the rig configuration. For example if a larger number of sectors were used masks corresponding to each of the sectors would correspond to a small viewing area than 120 degrees with more than 3 environmental grids being required to cover the diameter of the sphere.

Environmental map information is, in some embodiments, optionally transmitted to the playback device. It should be appreciated that the environmental map information is optional in that the environment may be assumed to be a default size sphere in the event such information is not communicated. In cases where multiple different default size spheres are supported an indication as to what size sphere is to be used maybe and sometimes is communicated to the playback device.

Image capture operations may be performed on an ongoing basis during an event particularly with regard to each of the 3 sectors which can be captured by the camera rig 102.

Note that while multiple camera views are captured corresponding to different sectors the image capture rate need not be the same for all sectors. For example, a front facing sector corresponding to e.g., the main playing field may capture images at a faster frame rate than the cameras corresponding to other sectors and/or the top (sky) and bottom (ground) views.

Drawing 2100 of FIG. 7 illustrates mapping of an image portion corresponding to a first sector to the corresponding 120 degree portion of the sphere representing the 3D viewing environment.

Images corresponding to different portions of the 360 degree environment are combined the extent needed to provide a contiguous viewing area to the viewer, e.g., depending on head position. For example, if the viewer is looking at the intersection of two 120 degree sectors portions of the image corresponding to each sector will be seemed and presented together to the viewer based on the known angle and position of each image in the overall 3D environment being simulated. The seeming and generation of an image will be performed for each of the left and right eye views so that two separate images are generated, one per eye, in the case of a stereoscopic implementation.

Drawing 2200 of FIG. 8 shows how multiple decoded, corrected, and cropped images can be, and sometime are, mapped and seemed together to create a 360 degree viewing environment which can be used as a background to which foreground images of objects represented by point cloud data can be applied.

FIG. 9 shows the steps 900 of a method of generating and communicating encoded frames providing foreground object textures and corresponding information which is performed by a content delivery system in some embodiments.

The method 900 begins in start step 902, e.g., with the stereoscopic image camera system 102 and content delivery system 104 being powered on and initialized. In step 904 stereo frames, e.g., one or more stereo frames are captured. Each stereo frame includes a frame pair where the frame pair includes a left image captured by a left camera and a right image captured by a right camera of a stereo camera pair of stereoscopic camera system 102, are captured. The left and right images of a stereoscopic frame are sometimes referred to as left and right eye images. With frames having been captured in step 904 operation moves to step 906 wherein a depth map is generated, e.g., based on the difference between the left and right eye images of at least one frame pair and, in some but not necessarily all embodiments, the known spacing between the lenses of the cameras used to capture the left and right eye images. The depth map provides information on the relative distance of objects in captured images from the cameras used to capture the images and thus provides depth, e.g., distance information, indicative of how far objects are from the cameras and thus how far they will seem from a viewer observing the captured images during playback.

Based on the depth information a distinction can be made between foreground and background portions of the image based on distance. The distance for considering an object a foreground object may be set by an operator of the system capturing and processing the images, e.g., 10 feet or less from the camera, or may be determined automatically as objects within a predetermined fraction of the total distance captured. For example if objects are captured in a range of 1 to 30 feet, the system may consider objects in the first ⅓ of the overall distance to be foreground objects and in such a case objects in the first 10 feet of distance would be considered foreground objects, and objects determined to be at a distance, e.g., depth, more than 10 feet away would be considered background objects.

While depth information can be used to distinguish between foreground and background, it can also be used to help identify objects since portions of an object are likely to be at the same or approximately the same depth. Consider that portions of a person or ball are likely not be more than a few inches or a couple of feet apart while a net or a seat is likely to be many feet from a player on a basketball court unless the player is in close proximity to the net or seat. Consider also that portions of an object such as a person will move as a unit from frame to frame, while background objects will often tend to be stationary or move very little from frame to frame. The shape of an object as well as its location can be, and sometimes is, detected based on the pixels corresponding to the shape, which may result in the shape having an outline that can be followed from frame to frame and tracked from frame to frame as the object moves. In various embodiments, in step 907 object detection is performed using depth information, image information, e.g., pixel data, contrast information, and/or visual changes detected from frame to frame showing movement of an object.

Operation proceeds from step 907 to step 908. In step 908 foreground is segmented from background, e.g., foreground objects are identified based on depth and/or motion. Operation proceeds from step 908 to step 910.

With objects having been identified in the captured frames, operation proceeds to step 910. In step foreground objects are cropped from captured frames. In some embodiments where the images are of a sporting event or play or other presentation involving human figures that move, the cropping is limited to the human figures and the objects that move with them. For example human figures and/or human figures with a ball or balls are cropped and treated as individual foreground objects. The cropping of foreground objects, e.g., figures, from the captured stereoscopic video occurs in step 910. While in some embodiments directed to augmented reality implementations, the extracted foreground objects will be combined with a locally captured background image based on the mask information and/or location information indicating where the foreground object, e.g., figure, is to be positioned in the locally captured background image with the image being scaled to reflect an appropriate size based on the location at which it is placed and the distance of the background from the user's viewing position. For example, an AR experience may involve displaying images of basketball players playing on a table top whose image is captured locally at the playback device making it appear that the basketball game is being played by small human figures on top of the table.

In embodiments where a background image is to be supplied for use with one or more extracted figures, the background image may be, and sometimes is, generated in step 911. In step 911 a background image is generated from a captured image which has been processed to remove extracted foreground objects, e.g., figures of players. The areas of the frame which are missing due to extraction of a foreground object are filled with content from a frame captured at another time, e.g., when the extracted foreground object was not present at the location from where it was extracted. While s left eye background image and a right eye background image may be, and sometimes are, generated by this filling technique to produce a complete stereoscopic frame including left and right eye background frames, content without any gaps or omissions due to foreground object extraction. In other embodiments a single background frame is generated and used for both left and right images with the position of foreground objects being shifted slightly to give foreground objects superimposed upon the mono-background a 3D perceived shape. The background frame generated from multiple captured frames may be, and sometimes does, correspond to multiple frame times and may be, and sometimes is, used by a playback device to generate multiple video frames by combining the background frame with different foreground objects corresponding to different frame times in a video sequence being generated by the playback device.

In embodiments where background frames are generated they are then encoded in step 912 prior to storage or communication to a playback device. Note that the number of background frames which are generated and communicated are normally less than the number of frames generated to communicate foreground objects with a background frame being used to generate many frames of a playback sequence, e.g., 5, 10 or even more frames. Thus far fewer background frames are generated and communicated in some embodiments that frames communicating foreground objects. In addition it should be noted that background frames are normally larger than the frames used to communicate foreground object information and are often 2, 5 or 10 times larger in size than the size of a foreground frame. This is because a background frame normally communicates image data for an entire scene area while a foreground frame communicates one or more foreground objects which occupy a small fraction, e.g., less than 50%, of a playback scene area to which a background frame corresponds.

In some embodiments the characters are optically scaled in step 913 so that the objects correspond to a predetermined size which would correspond to a single fixed distance from the camera. This scaling that is performed in some embodiments represents a normalization of object size so that the regardless of where a figure is captured on the court or in an environment they will be stored at a size corresponding to a set distance. The size of the object can then be scaled up or down to reflect a different distance form the fixed distance if the object is to be positioned at a different distance from the viewer during rendering performed by the playback device.

In step 914 a mask is created for each foreground object, e.g., figure, the mask includes information on the outline of the object and image data, e.g., pixel values, that are to be blended with a background image during playback. The mask may, and sometimes does, include alpha blending coefficients, e.g., one per pixel of the image, so that while a foreground object is communicated as a rectangular image or an image of predetermined shape for communications purposes in some embodiments, the mask will control pixels outside the outline of the figure, e.g., human shape, to be transparent so that background pixels are visible for portions outside the shape of the figure while pixels corresponding to the figures will appear as solid covering over the background pixels of a background image that would otherwise be displayed during playback. In some embodiments the mask also includes location information, e.g., where a pixel of the image is to be located in the background environment. This position information may be, and normally is, based on the position of the object in the environment where the images of the foreground objects were captured. Based on the location information the relative location of foreground objects communicated to a playback device is maintained with respect to each other so that figures, e.g., players, can be positioned at the corresponding locations over a background or image of a captured environment. In addition to location information and a blending coefficient, a mesh distortion coefficient is communicated for each pixel of the extracted object in some embodiments. This value indicates how much a default object mesh should be distorted to before application of the image of the foreground object to reflect the actual depth of the object from the user. Consider for example that the object may be applied during rendering to a default cylinder shaped mesh during rendering before being superimposed on the background. The depth information indicates how much the mesh location to which the pixel corresponds should be distorted, moved in or out, before application pixel to which the distortion value corresponds. As will be discussed below, in some embodiments a portion of a frame communicated to the playback device is used to communicate pixel values while another portion is used to communicate an alpha blending coefficient, a mesh distortion value and a location value. From the perspective of an encoder, the alpha blending coefficient, mesh distortion value and location value may appear as pixel values with these values being communicated in the frame in the place of an R, G, B value. Thus by using values normally used to communicate an R, G, and B values to communicate other information, e.g., coefficients, the coefficients can be encoded in an image frame as if they were pixel values with the playback device using the values to control location of objects, alpha blending and/or mesh distortion rather than an R, G, and B value of a pixel. In some embodiments an equal or predetermined amount of values which appear as pixel values to an encoded are used to communicate the information discussed above as shown in FIG. 12.

Figure 12:
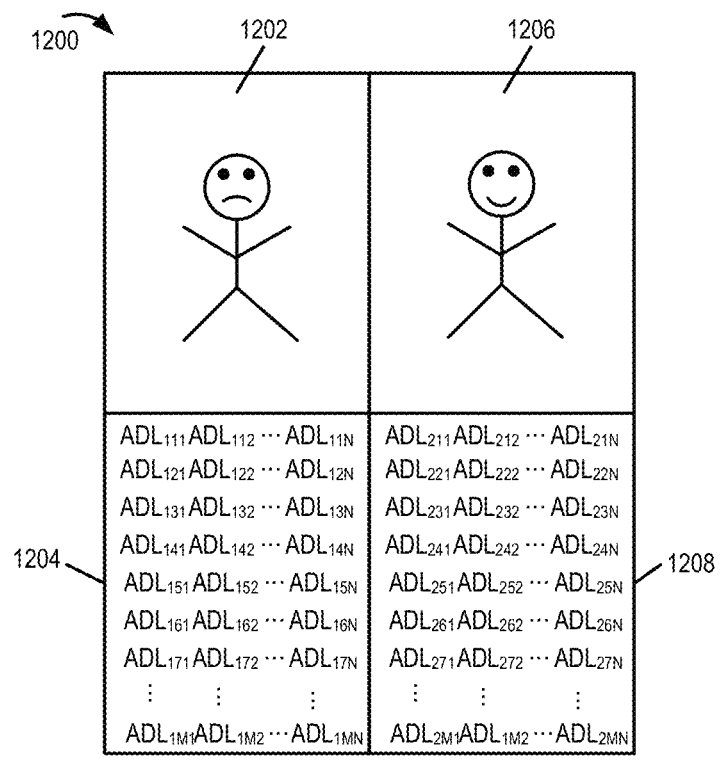
FIG. 12 illustrates the content of an exemplary encoded frame generated from the image shown in FIG. 11 and which is communicated in some embodiments to playback devices to provide foreground object information.

In step 914 after creation of the mask communicating alpha blending values, pixel location and mesh distortion information for each foreground object to be communicated, e.g., figure to be communicated, operation proceeds to step 916 in which a frame, e.g., a foreground frame communicating foreground object information, including the extracted images and corresponding mask information is generated. The mask information may, and sometimes does, include information on which of a plurality of predetermined object meshes should be used when rendering a corresponding foreground object, e.g., a spherical object mesh or a cylindrical object mesh. However in some embodiments a single default object mesh, e.g., a cylindrical object mesh, is used for rendering foreground objects. In such cases the mesh to be used need not be specified since a single default is available. A cylindrical object mesh has been found to be particularly useful for rendering human figures such as basketball players with or without a ball. An example of such a frame is shown in FIG. 12. While the frames appears as an ordinary frame to an encoder, a portion of the frame data is used to communication values, e.g., coefficients, other than RGB values as discussed above while still communicating pixel values in a portion of the frame to convey the values to be used as pixel values to represent the foreground objects which were extracted and are communicated in a frame.

Once the frames are constructed they are encoded in step 918, e.g., using a standard video encoder. e.g., an MPEG-2, MPEG-4 or other video encoder. In this way the mask information need not be processed or encoded separately and can be communicated in a video frame as if it were pixel values. Separate frames need not be sent for left and right images with the object information being communicated on a per object basis within a frame. In step 916 one frame of foreground objects is constructed for each frame of a video sequence. Since the constructed frame includes foreground objects and corresponding information and does not include background objects or background information, the frame can be relatively small in size. This allows for efficient encoding and transmission from a data perspective as opposed to systems which might try and communicate frames including both background and foreground objects. In some embodiments a frame generated in step 916 is less than 50 percent the size of a single eye frame from which it was constructed and in some embodiments less than ¼ the size of a single frame, e.g., captured left or right eye image, from which the frame of the invention was constructed. Thus in some embodiments the constructed frame which is encoded includes less than 50% of the number of data values, e.g., pixel values, included in a left or right frame of the original stereo frame captured in step 904 and sometimes less 25% of the values and in many cases 10% or fewer values than the original left or right image frame captured in step 904.

The frames generated in step 916, e.g., one for each captured stereo frame pair in a captured stereoscopic frame sequence, are encoded coded as a video sequence in step 918 for storage and/or transmission purpose. The encoded video sequence is then stored, e.g., in a content delivery device such as streaming server 114 and/or transmitted to a playback device such as the playback device 122 and/or 126 of FIG. 1. In some embodiments the communication to the playback device is made via a wireless communications link. In such cases the data saved by extracting and communicating foreground objects along with location and mesh distortion information for each object can provide a very efficient data communications method since the figures and the information needed to render them on a background can be communicated using very little data as compared to systems which communicate a complete frame, including background objects, for each frame of a video sequence.

In step 919, which is optional and performed in embodiments where background frames are communicated to a playback device, the encoded background frame generated in step 912 is stored and/or communicated to the playback device. Note that fewer background frames will normally be transmitted than foreground frames since in many cases a single background frame is used for multiple frame times with the foreground objects and/or locations changing over time.

In step 920 the video, referred to sometimes herein as foreground object video, including the encoded foreground objects and corresponding rendering information, is communicated to the playback device for use with a communicated background frame or a locally captured image. Operation is seen proceeding from step 920 to step 904 to show that the method may continue for an extended period of time.

The method shown in FIG. 9 is well suited for capturing images of players at a sporting event, extracting player information by treating them as foreground objects and communicating the player information to a playback device for use in rendering with either a supplied background image or a locally captured image. For example the method can be used when a user is using his/her cell phone as an augmented reality device and wishes to display images of players which were captured at a basketball game as if they were playing on a table top or other surface at the user's location. In such a case the surface at the user's location which is to serve as the background is captured by a camera on the cell phone operating as a playback device and combined with the foreground images of players captured at a game, extracted and communicated to the playback device in accordance with the invention.

Figure 10:
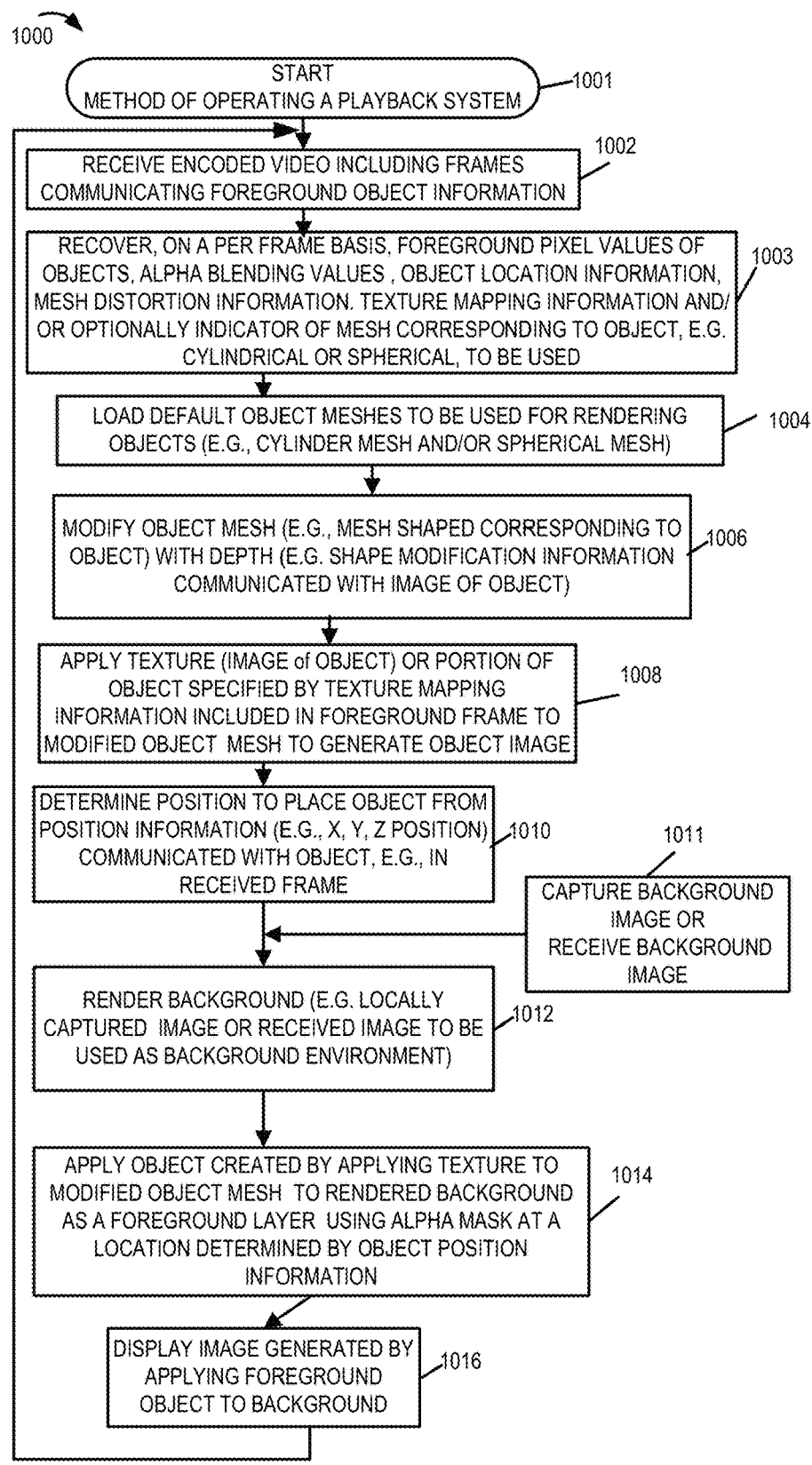
FIG. 10 shows the steps of a method of operating a playback device which receives and uses encoded frames providing foreground object information such as those generated by the method shown in FIG. 9.

FIG. 10 shows the steps of a method 1000 of operating a playback device which receives and uses encoded frames providing foreground object information such as those generated by the method shown in FIG. 9 and shown in, for example, FIG. 12. The playback device may be a cell phone with an integrated display located at a customer premise or another playback device. The playback device may be, and sometimes is, the playback system 300 shown in FIG. 3 in which a processor 808 controls the playback device to operate in accordance with the method shown in FIG. 10 and implement the steps of FIG. 10.

The playback method 1000 begins in start step 1001 Operation proceeds from start step 1001 to receive step 1002 in which encoded video, e.g., foreground frames including foreground objects and corresponding blending, location and/or mesh distortion information are received with in some cases a mesh shape to be used with individual foreground objects communicated by the frame also being included. In various embodiments foreground frames received in step 1002 do not include background image data and thus lack sufficient information to generate a complete frame that will be displayed by the playback device implementing the method, e.g., the foreground objects need in some embodiments to be combined, e.g., layered, on a background image whether that be a stereoscopic image with different left and right eye background images or a monoscopic (non-stereo) image where the same background image is used for left and right eye views.

With one or more frames communicating foreground object information having been received in step 1002 operation proceeds to step 1003 in which foreground object data, e.g., pixel values and corresponding alpha blending values, location information and mesh distortion information are received by decoding the received foreground frames and in some cases information indicating what shape mesh should be used for rendering a particular object with different shape meshes, e.g., cylindrical or spherical, being indicated for different objects in some embodiments. The recovery may, and sometimes does, involve using a video decoder to decode the foreground frame and then interpreting the recovered values with some of the values being interpreted as pixel values and other values being interpreted as alpha blending values used to define an object mask, pixel location values and mesh distortion values while other values in some embodiments indicate a mesh to be used in rendering an object. Each received foreground frame corresponds to a different frame time in a video sequence in some embodiments and includes one or more foreground objects to be rendered and layered on a background image as part of a rendering process.

Operation proceeds from step 1003 to step 1004 for each foreground frame recovered in step 1003. In step 1004 a default foreground object mesh or meshes to be used for individual foreground objects is loaded into memory. While in the example a single cylinder mesh is used for the foreground objects in some embodiments different shape object meshes are supported, e.g., a cylindrical object mesh and a spherical object mesh. In at least some such embodiment the particular shape mesh to be used is determined at encoding time and indicated in the frame so that in addition to the alpha blending values, pixel values defining an object, location and mesh distortion information the encoder also includes information indicating which of a plurality of predetermined meshes is to be used for rendering the object. Thus when the foreground object being rendered is a ball in some cases the encoded information indicates a spherical mesh is to be use an modified based on the communicated information and when a person is to be rendered a cylindrical mesh is to be used. The predetermined meshes may be, and sometimes are, communicated to the playback device by the content delivery system prior to individual frames which use the meshes. For purposes of explaining the invention a default cylindrical mesh will be used and modified to represent figures, e.g., basketball players, extracted from captured images and communicated as foreground objects along with information used to render the objects on top of a background image or background layer.

In step 1004 default object meshes are loaded into memory, e.g., the meshes to be used in rendering particular foreground objects recovered from the received foreground frame. Then in step 1006 the meshes are modified, one per foreground object to be rendered, based on the receive mesh distortion information corresponding to the object. Thus while a received foreground frame may, and sometimes does, include multiple foreground objects to be rendered using a default cylinder mesh, the default cylindrical mesh will be modified in step 1006 on a per object basis using the mesh distortion information corresponding to the received foreground object. Thus a figure, e.g., with an outstretched arm, will have a cylindrical mesh distorted in accordance with the mesh distortion information to extend outward reflecting the shape of the arm further than a foreground object, e.g., figure, without outstretched arms. Thus while different foreground objects are communicated in a foreground frame, the amount of mesh distortion applied to the default cylindrical mesh will depend on the shape of the foreground object for which mesh distortion is being implemented in step 1006. At the end of step 1006, there will be a separately distorted mesh model, one for each foreground object of the received frame for which step 1006 is performed.

Operation proceeds from step 1006 to step 1008 in which the texture, e.g., communicated pixel values of a foreground object, are applied as a texture to the corresponding distorted mesh generated in step 1006. Thus at the end of step 1008 textured objects will be available for application to a background with each textured object corresponding to a different distorted default mesh model and foreground object texture, e.g., pixel values.

Operation proceeds from step 1008 to step 1010 wherein the location to place each textured object with respect to the background is determined based on the communicated portion information which in various embodiments specifies a position in three dimensional space, e.g., an X, Y, Z position.

With the positions of foreground objects, e.g., figures of players, having been determined in step 1010, operation proceeds to step 1012 which uses background image information received or captured in step 1011 as part of a rendering process, e.g., to generate a background image layer or pair of left and right eye images in the case of a stereoscopic background on which foreground objects can be superimposed. Step 1011 involves either capturing a background image to use as part of a rendering operation or receiving background image. For example a camera on a cell phone being used as an augmented reality device can capture a image which will then be displayed with the foreground objects superimposed thereon and displayed on the display of the cell phone. Alternatively a background can be received, e.g., in encoded or unencoded form and the background recovered. In the case of a stereoscopic background different left and right eye image backgrounds may be, and sometimes are, received.

With the background having been rendered in step 1012, a common background image will be available in the case of a monoscopic background, and separate left and right eye image backgrounds will be available in the case of a stereoscopic background.

In step 1014, the foreground objects are applied to the background taking into consideration the alpha blending coefficients communicated in the foreground frame that control blending of an object with a background image along with the location information. As part of the rendering the foreground object may be, and sometimes is, scaled based on the specified location of the object, e.g., with objects placed far from the user being scaled to be smaller than objects placed in the user's field of view close to the user. Portions of a communicated object which are to be masked out will have an alpha blending coefficient which results in that portion being transparent while portions of objects which are to be visible will have an alpha blending coefficient which causes the portion to block out the view of the background when it is superimposed on the background image. Separate left and right eye images will be generated in a stereoscopic embodiment with the left and right eye images differing as would be expected for 3D foreground objects included in the environment represented by the background at the locations specified by the foreground object coordinates received in the foreground object frame.

In step 1016, the playback system displays on a playback device display, e.g., a display of a cell phone or a display of a head mounted display device, the images generated in step 1014 which include the foreground objects superimposed on the background image or images. This will result in different left and right eye images being displayed to the user because of the 3D nature of the foreground objects and/or the 3D nature of the background objects.

Operation is seen proceeding from step 1016 to step 1002 to show that the process is performed for multiple frames of a video sequence, e.g., with foreground objects being recovered and merged with a background for each frame of the video sequence. In some embodiments the rate at which the background is changed is slower than the foreground frame rate. In this way a user can be presented video of players moving across a field or stage with realistic 3D shapes perceivable to the view but without the need for the playback device to receive a different background for each frame being generated thereby greatly reducing the data rate needed to support communication of the video content. Furthermore where the playback device uses a locally captured background, an augmented reality experience can be achieved without the need to transmit background images from a remote location to the playback device allowing for AR implementations to support 3D objects generated from images captured at a remote location with the transmission of relatively little data a compared to cases where both background and foreground information are captured remotely and communicated to a playback device.

Figure 11:
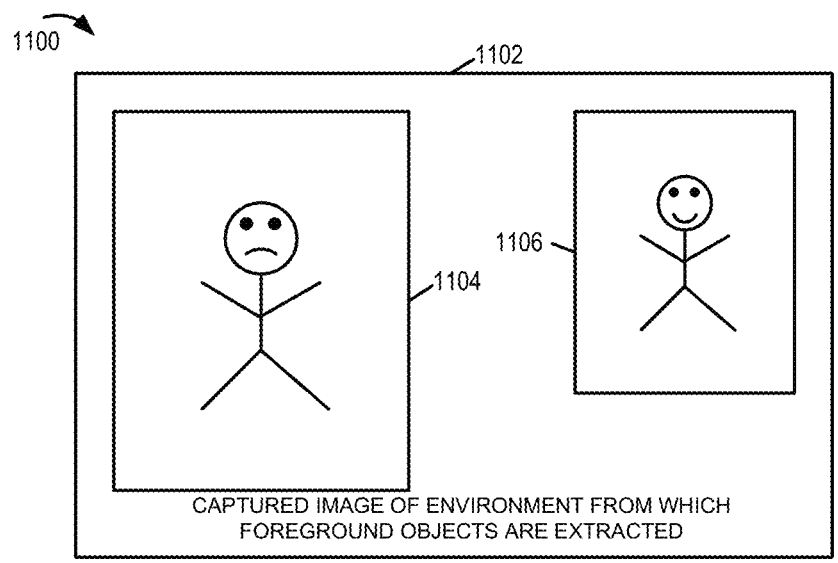
FIG. 11 shows an exemplary captured image from which foreground objects are cropped, optionally scaled and packed in to a frame for communications with information to facilitate use of the foreground object textures.

FIG. 11 is a diagram 1000 which shows an exemplary captured image 1102 from which foreground objects are cropped, optionally scaled and packed in to a frame for communications with information to facilitate use of the foreground object textures. The captured image 1102 includes an image of two players, a sad player 1104 which appears larger in the image 1102 because he is closer to the cameras of the image capture system 102 than the happy player whose image 1106 is smaller since he is further away from the cameras of the image capture system. FIG. 11 illustrates a frame which would be captured by one camera of a stereoscopic camera pair. While two images, e.g., left and right eye images are captured in some embodiments to be used in generating depth information, the images which are cropped come from a single captured frame, e.g., one of the left and right frames. Thus a single foreground object image is communicated with mesh distortion information and position, e.g., in the environment where the image was captured, being used to control 3D rendering in the playback device.

FIG. 12 shows an exemplary encoded foreground frame 1200 including multiple cropped and scaled foreground objects. Not that the scaling results in a normalization of foreground objects in terms of size with the size having been scaled based on the distance from the camera at which the object was captured so that while objects of the same size appear different sizes in the captured image, objects such as players of the same size will appear the same size in the foreground frame.

Foreground frame 1200 corresponds to and is generated from the captured image 1102 and depth information, e.g., obtained from an additional image captured at the same time as captured image 1102 but by another camera. Foreground frame 1200 includes cropped and scaled foreground object images 1202 and 1206, represented as pixel values. Foreground object 1202 is generated by cropping and scaling object 1104 while object 1106 is generated by cropping and scaling image 1106. Not that as part of the image size normalization process, the size of image 1104 is scaled down and the size of image 1106 is scaled up. Information 1204 included in the foreground frame 1200 includes alpha (A) blending coefficients, mesh distortion information and object location information (L) for foreground object 1202 while information 1208 corresponds to object 1206 and includes alpha (A) blending coefficients, mesh distortion information and object location information (L) for foreground object 1206. The information 1204 corresponding to object 1202 may, and sometimes does, include information indicating a mesh model, e.g., a cylindrical or spherical model, which is to be used for rendering object 1202 and information, e.g., texture mapping information, indicating how the object 1202 is to be mapped, e.g., applied, to the mesh model corresponding to the object 1202. The information 1208 corresponding to foreground object 1206 may, and sometimes does, include information indicating a mesh model, e.g., a cylindrical or spherical model, which is to be used for rendering object 1206 and information, e.g., texture mapping information, indicating how the object 1206 in the form of pixel values representing a texture is to be mapped, e.g., applied, to the mesh model corresponding to the object 1206.

Thus it should be appreciated that FIG. 12 shows an encoded frame, e.g., a foreground frame generated in accordance with the invention, that includes images 1202, 1206 of extracted foreground objects, corresponding alpha blending coefficients, and mesh distortion information as well as placement information to be used in rendering the foreground objects and positing them in or on a background.

FIG. 13 shows content delivery system operation under the heading 2301 on the left and playback device operation on the right under the heading playback device operation 2319. The content delivery system and playback devices of FIG. 1 can be used to implement the method shown in FIG. 13. In the FIG. 13 example the content delivery system captures stereoscopic image data, e.g., left and right eye images, in step 2302 and then generates depth map information in step 2304 from the captured image data. The depth map produced in step 2304, on a per stereoscopic frame pair basis, is then used in step 2306 to segment foreground objects from the background. Depth map information is stored in step 2318 on a per foreground object basis with the depth information providing information on the shape and location of the object in the images of the original environment where the foreground objects were observed, e.g., at a basketball court or on a stage.

Operation proceeds from step 2306 to step 2308 in which foreground objects are cropped. In step 2310 foreground tracking information is generated showing the position of the object in one or more sequential frames. In step 2312 the position of a foreground object is determined on a per frame basis, sometimes with the information being determined for multiple sequential frames. The location in some embodiments is a location in the real world in terms of X, Y, Z coordinates corresponding to the environment in which the foreground object image was captured and with the coordinate 0,0,0 corresponding to the location where the camera was positioned that captured the image of the foreground object. Since a viewer will normally be perceived as viewing images from the position of the camera which captured them during playback, the X, Y, Z coordinates can be used by the playback device to determine where to position a foreground object on a background or in a 3D background environment represented by a pair of left and right eye background images. In step 2314 a foreground frame is generated including multiple foreground objects along with corresponding position, mesh information, texture map information and/or alpha blending information. Multiple locations can be, and sometimes are, specified for a foreground object, e.g., with an individual location specification the location where the object is to be placed in an individual frame and the next location indicating the location where the object is to be placed in the next frame of a video sequence. The foreground frame corresponding to one or more frame times is then encoded using a video encoder for storage and/or communication to a playback device. Background image data can be generated and is communicated in some embodiments separately form the foreground image data but in other embodiments background images are obtained locally using an image capture device which is part of the playback system which in some cases operates as an augmented reality device. Thus in at least some embodiments a single foreground frame communicates foreground objects to be used in multiple sequential frames of a video sequence with one location being specified for each frame time. By specifying a location outside a visible area in some embodiments for an object, the fact that the object is not to be displayed in the corresponding frame time where the location is outside the users field of view is communicated to the playback device. Thus while a foreground frame corresponding to multiple frame times might communicate multiple foreground objects the objects need not be displayed in all of the frame times to which the foreground frame corresponds. In other embodiments a single foreground frame and foreground objects is communicated for each frame time. As part of the information included in the foreground frame, alpha values used for controlling how a correspond foreground object is to be applied to a background is included along with location and mesh model distortion information and optional information identifying the mesh module to which the foreground object in the form of a texture is to be applied to the model.

Block 2332 represents an exemplary foreground image frame including four foreground objects represent by the four upper blocks in the first row of block 2332. The lower row of block 2332 includes four sets of information with each set of information corresponding to the particular foreground object above the set of information in the second row. The gray shape is used to indicate the alpha blending value information while additional information in the form of foreground object location in one or more frames times, mesh model to be used to render the object, and other information is included in the set of information included for each particular foreground object. In one embodiment, the information for the first three objects of human figures indicates that a cylindrical mesh model should be used for rendering the foreground objection while the fourth foreground object is a ball and the information corresponding to the ball object indicates that a spherical mesh module should be used for rendering the image of the ball. Thus the upper row includes pixel values defining objects while the lower row includes information corresponding to the object shown directly above the rectangle in the lower row. From the perspective of a video encoder both the pixel values and the information values are treated the same and encoded as if they were all pixel values but with the playback device understanding the values in the lower row are to be interpreted as communicating particular information, e.g., in accordance with a predetermine mapping of information to different types of data such as alpha blending coefficients, location information, mesh type information, text mapping information and/or other information communicated in the foreground frame.

The foreground frame or frames 2332 are communicated to a playback device, e.g., system and processed to generate images. Playback steps are shown under the heading 2319 in FIG. 13. As part of the playback device operation the foreground images are received and decoded. Then in step 2320 an object mesh is loaded for each foreground object in a foreground frame and then in step 2322 modified with the mesh distortion e.g., depth information, corresponding to the object in the frame. The distortion includes scaling of the mesh to take into consideration where the object will be placed in the environment in some embodiments. The location where the object is positioned in the environment is determined based on the X, Y, and Z coordinates specified in the received information for the frame period being rendered as part of step 2324 and then in step 2326 the background is rendered, e.g., a background layer image is generated from an image captured by the playback device or background image information received by the playback device.

Next in step 2328 the foreground objects or objects which were applied to their corresponding mesh models are mapped, e.g., onto the background using the alpha blending values communicated in the foreground frame to determine which portions of a communicated foreground object will be visible in place of the background. Thus the alpha values allow the figure to be visible but the portions of the rectangular foreground object which do not correspond to the figure will not obscure the background to which the foreground objects are applied.

Reference number 2330 is used to show the application of two foreground objects, figures, positioned at two different locations on a background represented as a grid. The cylinders are used to indicate that a cylindrical mesh model was used to render the foreground objects which are figures but the cylinder will not be visible in the final rendered image.

In the case where the foreground frame 2332 includes foreground object location information corresponding to multiple frames, a set of rendered images 2330 will be generated and displayed with the position of the figures varying from frame to frame based on the differences in location information for the foreground figures specified for different frame times.

While steps are shown in an exemplary order it should be appreciated that in many cases the order of the steps may be altered without adversely affecting operation. Accordingly, unless the exemplary order of steps is required for proper operation, the order of steps is to be considered exemplary and not limiting.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed:

1. A method of operating a content delivery system, the method comprising:
    extracting a foreground object image showing a foreground object from a captured image;
    generating mesh distortion information for the foreground object, wherein the mesh distortion information comprises data indicative of distortion to be applied to a default object mesh to obtain a distorted object mesh, wherein the distorted object mesh represents a shape of the foreground object;
    packing the foreground object image and the mesh distortion information into a frame; and
    transmitting the frame to a playback device.

2. The method of claim 1, further comprising:
    packing a set of alpha blending coefficients into the frame.

3. The method of claim 1, wherein the captured image comprises a plurality of foreground objects, wherein for each unique foreground object in the plurality of foreground objects the method further comprises:
    extracting a unique foreground object image showing the unique foreground object from the captured image;
    generating a unique set of mesh distortion information for the unique foreground object, wherein the unique set of mesh distortion information comprises data indicative of a distortion to be applied to the default object mesh to obtain a distorted object mesh, wherein the distorted object mesh represents a shape of the unique foreground object; and
    packing the unique foreground object image and the unique set of mesh distortion information into the frame.

4. The method of claim 1, further comprising:
    generating object placement information indicative of a display position for the foreground object image; and
    packing the object placement information into the frame.

5. A content delivery system, the system comprising:
    a non-transitory computer readable medium;
    at least one processor coupled to the non-transitory computer readable medium and configured to execute instructions stored in the non-transitory computer readable medium which cause the at least one processor to:
        extract a foreground object image showing a foreground object from a captured image;
        generate mesh distortion information for the foreground object, wherein the mesh distortion information comprises data indicative of a distortion to be applied to a default object mesh to obtain a distorted object mesh, wherein the distorted object mesh represents a shape of the foreground object;
        pack the foreground object image and the mesh distortion information into a frame; and
        transmit the frame to a playback device.

6. A playback system, comprising:
    at least one non-transitory computer-readable medium comprising computer instructions; and
    a processor coupled to the at least non-transitory computer-readable medium and configured to execute the computer instructions which cause the processor to:
        obtain a frame comprising textures of a plurality of foreground objects and corresponding object mesh distortion information, wherein the object mesh distortion information comprises data indicative of a distortion to be applied to a default object mesh to obtain distorted object meshes, wherein the distorted object meshes represent shapes of the foreground objects;
        for each unique foreground object in the plurality of foreground objects:
            distort the default object mesh based on the corresponding object mesh distortion information;
            apply the texture of the foreground object to the distorted object mesh to obtain a foreground object image; and
        generate an output image based on the plurality of foreground object image.

7. The content delivery system of claim 5, wherein the at least one processor is further configured to execute instructions which cause the at least one processor to pack a set of alpha blending coefficients into the frame.

8. The content delivery system of claim 5, wherein the captured image comprises a plurality of foreground objects, wherein the at least one processor is further configured to execute instructions which cause the at least one processor to, for each unique foreground object in the plurality of foreground objects:
- extract a unique foreground object image showing the unique foreground object from the captured image;
- generate a unique set of mesh distortion information for the unique foreground object, wherein the unique set of mesh distortion information comprises data indicative of a distortion to be applied to the default object mesh to obtain a distorted object mesh, wherein the distorted object mesh represents a shape of the unique foreground object;
- pack the unique foreground object image and the unique set of mesh distortion information into the frame.

9. The content delivery system of claim 5, wherein the at least one processor is further configured to execute instructions which cause the at least one processor to:
- generate object placement information indicative of a display position for the foreground object image; and
- pack the object placement information into the frame.

10. The playback system of claim 6, wherein the processor is further configured to execute computer instructions which cause the processor to obtain, for each unique foreground object in the plurality of foreground objects, object placement information indicative of a display position for the unique foreground object, and wherein the processor is further configured to generate the output image based on the object placement information.

* * * * *